United States Patent
Zhang et al.

(10) Patent No.: US 11,546,932 B2
(45) Date of Patent: *Jan. 3, 2023

(54) DATA TRANSMISSION METHOD, TERMINAL AND NETWORK SIDE DEVICE

(71) Applicant: VIVO MOBILE COMMUNICATION CO., LTD., Chang'an Dongguan (CN)

(72) Inventors: Chenlu Zhang, Chang'an Dongguan (CN); Haihui Gong, Chang'an Dongguan (CN); Fei Qin, Chang'an Dongguan (CN); Xiaodong Shen, Chang'an Dongguan (CN); Yu Ding, Chang'an Dongguan (CN); Xiaolong Li, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 12 days.

This patent is subject to a terminal disclaimer.

(21) Appl. No.: 17/227,594

(22) Filed: Apr. 12, 2021

(65) Prior Publication Data

US 2021/0235472 A1   Jul. 29, 2021

Related U.S. Application Data

(62) Division of application No. 16/346,868, filed as application No. PCT/CN2017/108642 on Oct. 31, 2017, now Pat. No. 11,013,026.

(30) Foreign Application Priority Data

Nov. 4, 2016   (CN) .......................... 201610964285.X

(51) Int. Cl.
*H04W 72/12*   (2009.01)
*H04W 76/27*   (2018.01)
(Continued)

(52) U.S. Cl.
CPC ... *H04W 72/1268* (2013.01); *H04W 72/1242* (2013.01); *H04W 72/14* (2013.01);
(Continued)

(58) Field of Classification Search
CPC . H04W 72/1268; H04W 76/27; H04W 72/14; H04W 74/08; H04W 74/0833
See application file for complete search history.

(56) References Cited

U.S. PATENT DOCUMENTS 11,013,026 B2 * 5/2021 Zhang .................. H04W 76/27
2007/0286080 A1 12/2007 Kim et al.
(Continued)

FOREIGN PATENT DOCUMENTS

CN   102170677 A   8/2011
CN   102892192 A   1/2013
(Continued)

OTHER PUBLICATIONS

1st Chinese Office Action for Chinese Application No. 201610964285.X, dated May 23, 2019 (May 23, 2019)—10 pages English translation—12 pages).

(Continued)

*Primary Examiner* — James P Duffy
(74) *Attorney, Agent, or Firm* — Culhane Meadows PLLC; Stephen J. Weed

(57) ABSTRACT

The present disclosure provides a data transmission method, a terminal, and a network side device. The data transmission method includes: before an air interface signaling connection is established, sending a data message carrying state transition data to a network side device; receiving a response message returned by the network side device in response to the data message, a data transmission indication included in
(Continued)

the response message; when the data transmission indication indicates transmitting, sending an uplink data packet to the network side device.

16 Claims, 13 Drawing Sheets

(51) Int. Cl.
  *H04W 72/14* (2009.01)
  *H04W 74/08* (2009.01)
  *H04W 76/00* (2018.01)
(52) U.S. Cl.
  CPC ............ *H04W 74/08* (2013.01); *H04W 76/00* (2013.01); *H04W 76/27* (2018.02); *H04W 74/0833* (2013.01)

(56) References Cited

U.S. PATENT DOCUMENTS

| | | |
|---|---|---|
| 2011/0249641 A1 | 10/2011 | Kwon et al. |
| 2012/0287877 A1 | 11/2012 | Han et al. |
| 2013/0089061 A1 | 4/2013 | Lim et al. |
| 2013/0188590 A1 | 7/2013 | Aiba et al. |
| 2014/0133430 A1 | 5/2014 | Yang et al. |
| 2015/0282213 A1 | 10/2015 | Sun et al. |
| 2016/0366704 A1 | 12/2016 | Lee et al. |
| 2019/0082490 A1 | 3/2019 | Zhang et al. |

FOREIGN PATENT DOCUMENTS

| | | |
|---|---|---|
| CN | 104105214 A | 10/2014 |
| CN | 105636207 A | 6/2016 |
| CN | 105898894 A | 8/2016 |
| WO | 2014056426 A1 | 4/2014 |
| WO | 2015129985 A1 | 9/2015 |

OTHER PUBLICATIONS

CATT: Small Data Transmission in Inactive State, 3GPP Draft; R2-166118, 3rd Generation Partnership Project (#GPP), Oct. 14, 2016, Kaohsiung (4 pages).
Ericsson: "Issues in small data transmission in inactive state," Tdoc R2-166921, 3GPP TSG-RAN WG2 #95bis, Kaohsiung, Taiwan, Oct. 10, 2016, 5 pages.
Ericsson: "Small data transmission for inactive UEs", 3GPP Draft; [NR CP] R2-166922—Small Data Transmission, 3rd Generation Partnership Progect (3GPP), Oct. 10, 2016, Taiwan (7 pages).
European Office Action for European Application No. 17868241.5, dated Feb. 22, 2021 (Feb. 22, 2021)—19 pages.
Extended European Search Report for European Application No. 17868241.5, dated Sep. 17, 2019 (Sep. 17, 2019)—17 pages.
International Search Report and Written Opinion for International Application No. PCT/CN2017/108642, dated May 16, 2019 (May 16, 2019)—11 pages (English translation—6 pages).
1st US Non-Final Office Action for U.S. Appl. No. 16/346,868, dated Apr. 6, 2020 (Apr. 6, 2020)—13 pages.
2nd US Final Office Action for U.S. Appl. No. 16/346,868, dated Oct. 16, 2020 (Oct. 16, 2020)—15 pages.

* cited by examiner

DATA TRANSMISSION METHOD, TERMINAL AND NETWORK SIDE DEVICE

CROSS-REFERENCE TO RELATED APPLICATION

This application is a continuation of U.S. patent application Ser. No. 16/346,868 which is the U.S. national phase of PCT Application No. PCT/CN2017/108642 filed on Oct. 31, 2017, which claims the benefit of Chinese Patent Application No. 201610964285.X, filed on Nov. 4, 2016, the disclosures of which are incorporated herein in its entirety by reference.

TECHNICAL FIELD

The present disclosure relates to the field of communication technologies, and in particular, to a data transmission method, a terminal and a network side device.

BACKGROUND

With the continuous development of wireless technology, 5G technology becomes a development direction of the next generation of mobile communication technology. According to a definition of requirements of 5G defined by ITU currently, in the coming era 5G, a connection density may reach 1 million/Km$^2$, and a minimum end-to-end latency may reach 1 ms. This puts extremely high requirements on the standardization of mobile communications. At the same time, the coming 5G may support all vertical industries, and new technologies may incubate many new service forms. In a definition of requirements of 3 GPP, three major application scenarios are identified:

eMBB (Enhanced mobile broadband);
mMTC (Massive machine-type-communications);
uRLLC (Ultra reliable and low latency communications);
among them, the mMTC scenario is mainly aimed at optimization of the Internet of Things, such as smart water meters, smart meters, wearable devices, and the like. One main feature of this scenario is: a large number of terminals and connections, relatively small data transmission requirements and data concurrency. On the other hand, the uRLLC scenario is also an important scenario of 5G such as a car networking scenario, a VR/AR application, and a telemedicine scenario. In this scenario, there is very low user plane latency and signaling plane latency from end to end.

However, in a conventional system, a method for a terminal to access network for sending an uplink data packet is described as follows: first, the terminal initiates a random access request message, and then a network side device responds to the random access request message, and returns a random access response message. An initial RRC message is sent according to a data transmission parameter configured by the random access response message. Finally, a process of establishing a RRC connection is initiated to the initial RRC message according to the network side device. After the RRC connection, the uplink data packet is sent to a core network. Due to poor flexibility of network control, the RRC connection is required to be established when the uplink data packet is sent each time, which is not applicable to a scenario with low latency requirements.

SUMMARY

The embodiments of the present disclosure provide a data transmission method, a terminal, and a network side device, to solve the problem of performing state transition every time when uplink data is sent.

In a first aspect, an embodiment of the present disclosure provides a data transmission method, including: before an air interface signaling connection is established, sending a data message carrying state transition data to a network side device; receiving a response message returned by the network side device in response to the data message, wherein a data transmission indication is included in the response message; when the data transmission indication indicates transmitting, sending an uplink data packet to the network side device.

In a second aspect, an embodiment of the present disclosure provides a data transmission method, including: receiving a data message carrying state transition data sent by a terminal before an air interface signaling connection is established; returning a response message to the terminal based on the data message, wherein a data transmission indication is included in the response message; receiving an uplink data packet sent by the terminal when the data transmission indication indicates transmitting.

In a third aspect, an embodiment of the present disclosure provides a terminal, including: a data message sending module, to send a data message carrying state transition data to a network side device before an air interface signaling connection is established; a response message receiving module, to receive a response message returned by the network side device in response to the data message, wherein a data transmission indication is included in the response message; a data packet sending module, to send an uplink data packet to the network side device when the data transmission indication indicates transmitting.

In a fourth aspect, an embodiment of the present disclosure provides a network side device, including: a data message receiving module, to receive a data message carrying state transition data sent by a terminal before an air interface signaling connection is established; a response message sending module, to return a response message to the terminal based on the data message, wherein a data transmission indication is included in the response message; a data packet receiving module, to receive an uplink data packet sent by the terminal when the data transmission indication indicates transmitting.

In a fifth aspect, an embodiment of the present disclosure provides a mobile terminal, including: a storage, a processor, and a computer program stored in the storage and executed by the processor, the processor executing the computer program to implement the data transmission method in the first aspect.

In a sixth aspect, an embodiment of the present disclosure provides a network side device, including: a storage, a processor, and a computer program stored in the storage and executed by the processor, the processor executing the computer program to implement the data transmission method in the second aspect.

In the embodiments of the present disclosure, before the air interface signaling connection is established, the data message carrying the state transition data is sent to the network side device; the response message returned by the network side device in response to the data message is received, in which the data transmission indication is included in the response message. When the data transmission indication indicates transmitting, the uplink data packet is sent to the network side device. Since it may be controlled whether the uplink data packet is migrated to the RRC connection state for transmission, a latency requirement of service data may be effectively reduced, thus flexibility of network behaviors is improved.

BRIEF DESCRIPTION OF THE DRAWINGS

In order to more clearly illustrate the technical solutions of the embodiments of the present disclosure, the drawings used in the description of the embodiments of the present disclosure will be briefly described. It is obvious that the drawings in the following description are some embodiments of the present disclosure. Other drawings may also be obtained by the person skilled in the art according to the following drawings without creative efforts.

DETAILED DESCRIPTION

Hereinafter, technical solutions in embodiments of the present disclosure are clearly and completely described with reference to the accompanying drawings in the embodiments of the present disclosure. It is obvious that the described embodiments are a part of the embodiments of the present disclosure, and not all of the embodiments. All other embodiments obtained by the person skilled in the art based on the embodiments of the present disclosure without creative efforts are within the scope of the present disclosure.

A First Embodiment

Figure 1:
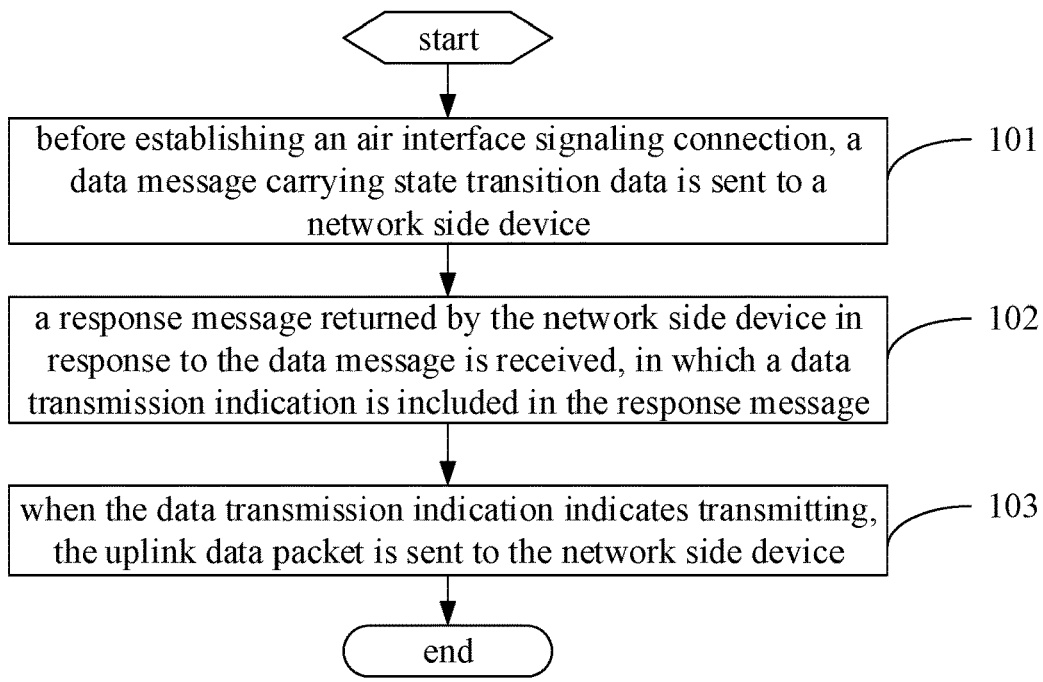
FIG. 1 is a flowchart of a data transmission method according to a first embodiment of the present disclosure.

Referring to FIG. 1, which is a flowchart of a data transmission method according to an embodiment of the present disclosure. As shown in FIG. 1, the method includes following steps.

Step 101: Before establishing an air interface signaling connection, a data message carrying state transition data is sent to a network side device.

In the embodiment of the present disclosure, the air interface signaling is a data transmission signaling protocol from end to end. For example, an existing air interface signaling includes radio resource control protocol signaling. The radio resource control protocol is RRC (Radio Resource Control), and the state transition data is a data feature indicating whether or not to support a data transmission mode in which state transition is not performed. The state transition refers to a change in a connection state of the RRC. Specifically, the state transition means changing from disestablishment of the RRC connection to establishment of the RRC connection. A type of the data feature may be set according to actual requirements, for example, may be a determination condition of whether or not to support the data transmission mode in which the state transition is not performed, or a determination result of the determination condition, which are described in detail in following embodiments. The above network side device refers to a base station.

For example, when a mobile terminal does not generate service data for a long time, the mobile terminal may automatically disconnect the RRC connection with the core network. When uplink service data (uplink data packet) is sent again, the RRC connection may be established to send the data packet to the core network. Specifically, the service data may be any type, such as a smart water meter service, a car networking service, or an eMBB service, etc.

Step 102: A response message returned by the network side device in response to the data message is received, in which a data transmission indication is included in the response message.

In this step, the data transmission indication includes two states: transmitting or non-transmitting. After receiving the data message, the network side device may respond to the data message. The data transmission indication is included in the response message. Specifically, a response mode matches contents of the data message. Since the state transition data in the data message may be in multiple forms, multiple response modes may be correspondingly configured. For example, when the state transition data is the determination condition of whether or not to support the data transmission mode in which the state transition is not performed, the network side device determines, according to the determination condition, whether the terminal supports the data transmission mode in which the state transition is not performed, thereby sending the data transmission indication. When the state transition data is the determination result of the determination condition, the data transmission indication may be directly sent according to the determination result. Or network side information acquired by the network side device may be used to determine whether the terminal is allowed to transmit data without state transition, and then the data transmission indication is sent.

Step 103: When the data transmission indication indicates transmitting, the uplink data packet is sent to the network side device.

In this step, after the terminal receives the response message from the network side device, the terminal performs a corresponding operation according to the data transmission indication in the response message. Specifically, when the data transmission indication indicates transmitting, the uplink data packet may be sent to the network side device. After receiving the uplink data packet, the network side device sends the uplink data packet to the core network, thereby completing transmission of the uplink data packet.

It can be understood that the determination rule of the data transmission mode that does not support the state transition of different service data may be configured according to actual requirements, which is not further limited herein.

In the embodiment of the present disclosure, the terminal may be any mobile terminal having functions of displaying and installing an application, such as a mobile phone, a tablet personal computer, a laptop computer, a personal digital assistant (PDA), a Mobile Internet Device (MID), or a Wearable Device (WD), etc.

In this embodiment, before the air interface signaling connection is established, the data message carrying the state transition data is sent to the network side device; the response message returned by the network side device in response to the data message is received, in which the data transmission indication is included in the response message. When the data transmission indication indicates transmitting, the uplink data packet is sent to the network side device. Since it may be controlled whether the uplink data packet is migrated to the RRC connection state for transmission, a latency requirement of service data may be effectively reduced, thus flexibility of network behaviors is improved.

The present disclosure solves a signaling load problem in the Internet of Things (IoT) scenario caused by the migration from an IDLE state of the terminal to a RRC state when a large number of mMTC (Massive Machine Type Communication) access networks to transmit bursty small data packets.

A Second Embodiment

Figure 2:
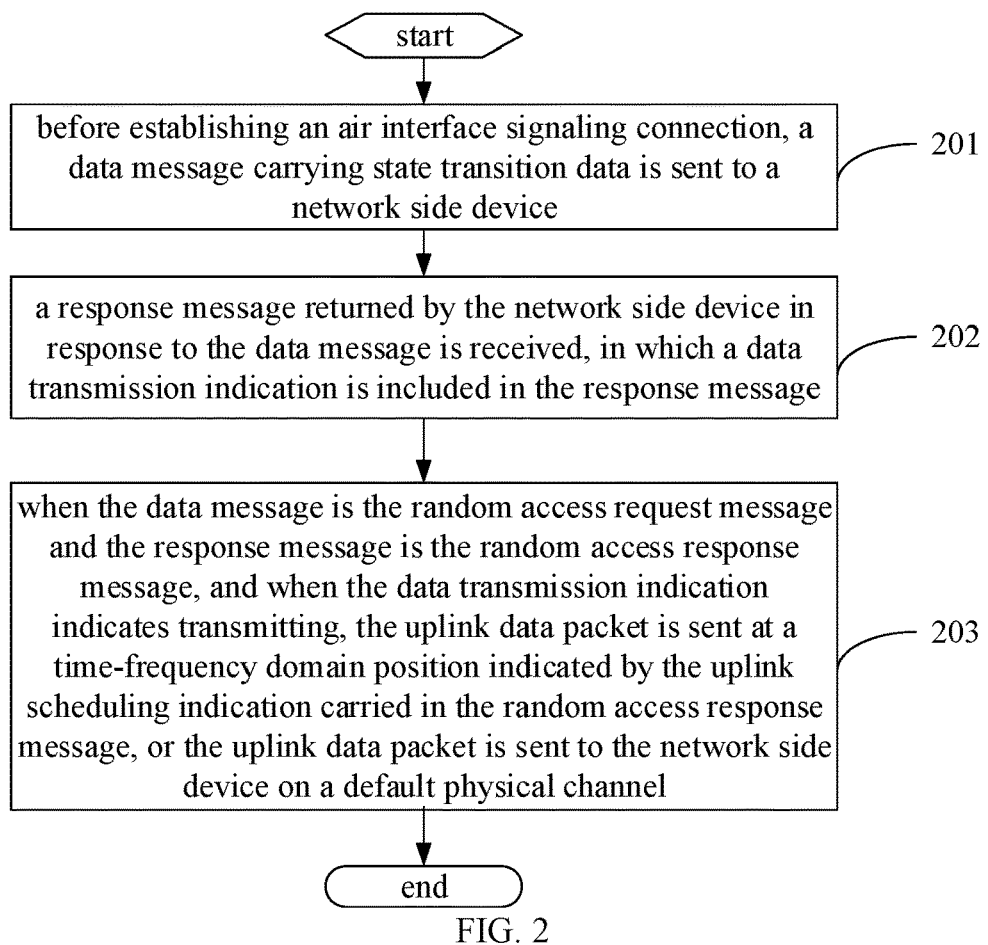
FIG. 2 is a first flowchart of a data transmission method according to a second embodiment of the present disclosure.

Referring to FIG. 2, which is a flowchart of a data transmission method according to an embodiment of the present disclosure. As shown in FIG. 2, the method includes following steps.

Step 201: Before establishing an air interface signaling connection, a data message carrying state transition data is sent to a network side device.

In the embodiment of the present disclosure, the air interface signaling is a data transmission signaling protocol from end to end. For example, an existing air interface signaling includes radio resource control protocol signaling. The radio resource control protocol is RRC (Radio Resource Control), and the state transition data is a data feature indicating whether or not to support a data transmission mode in which state transition is not performed. The state transition refers to a change in a connection state of the RRC. Specifically, the state transition means changing from disestablishment of the RRC connection to establishment of the RRC connection. A type of the data feature may be set according to actual requirements, for example, may be a determination condition of whether or not to support the data transmission mode in which the state transition is not performed, or a determination result of the determination condition, which are described in detail in following embodiments. The above network side device refers to a base station.

In this embodiment, the data message is a random access request message. That is, during a random access procedure, it is determined whether to establish a radio resource control protocol connection to send an uplink data packet. Specifically, msg1 to msg4 are included in the random access procedure, in which msg1 is the random access request message, msg2 is a random access response message replied to the random access request message, msg3 is an initial RRC message, and msg4 is a response message of the initial RRC message. In this embodiment, the state transition data is carried in the msg1 sent by the terminal.

For example, when a mobile terminal does not generate service data for a long time, the mobile terminal may automatically disconnect the RRC connection with the core network. When uplink service data (uplink data packet) is sent again, the RRC connection may be established to send the data packet to the core network. Specifically, the service data may be any type, such as a smart water meter service, a car networking service, or an eMBB service, etc.

Step 202: A response message returned by the network side device in response to the data message is received, in which a data transmission indication is included in the response message.

In this step, the data transmission indication includes two states: transmitting or non-transmitting. After receiving the data message, the network side device may respond to the data message. The data transmission indication is included in the response message. Specifically, a response mode matches contents of the data message. Since the state transition data in the data message may be in multiple forms, multiple response modes may be correspondingly configured. For example, when the state transition data is the determination condition of whether or not to support the data transmission mode in which the state transition is not performed, the network side device determines, according to the determination condition, whether the terminal supports the data transmission mode in which the state transition is not performed, thereby sending the data transmission indication. When the state transition data is the determination result of the determination condition, the data transmission indication may be directly sent according to the determination result. Or network side information acquired by the network side device may be used to determine whether the terminal is allowed to transmit data without state transition, and then the data transmission indication is sent. For example, when the network side device does not support data transmission without state transition, the data transmission indication may be directly configured as non-transmitting.

It should be noted that the random access response message further includes uplink timing TA used as uplink synchronization, a temporary identifier C-RNTI used for temporarily identifying a UE, signaling P used as uplink power control, and an uplink scheduling indication (UL grant) used as msg3 scheduling. A moment for transmitting the uplink data packet may be controlled according to a value of each parameter in the random access response message.

Step 203: When the data message is the random access request message and the response message is the random access response message, and when the data transmission indication indicates transmitting, the uplink data packet is sent at a time-frequency domain position indicated by the uplink scheduling indication carried in the random access response message. Or the uplink data packet is sent to the network side device on a default physical channel.

In this step, after the terminal receives the response message from the network side device, the terminal performs a corresponding operation according to the data transmission indication in the response message. Specifically, when the data transmission indication indicates transmitting, the uplink data packet may be sent to the network side device. After receiving the uplink data packet, the network side device sends the uplink data packet to the core network, thereby completing transmission of the uplink data packet.

It can be understood that the determination rule of the data transmission mode that does not support the state transition of different service data may be configured according to actual requirements, which is not further limited herein.

It can be understood that a mode for sending the uplink data packet may be configured according to actual requirements, for example, the uplink data packet may be sent on the default physical channel, or may be sent at the time-frequency domain position indicated by the uplink scheduling indication. The default physical channel refers to a physical channel (a pre-configured physical channel) known by the terminal. Specifically, the method for transmitting the uplink data packet may be configured according to actual requirements. For example, the random access response message may be configured to include a selection identifier for indicating the mode of sending the uplink data packet. In addition, when the uplink scheduling indication is not included in the response message, the default physical channel is used to send the uplink data packet by default.

In the embodiment of the present disclosure, the mobile terminal may be any mobile terminal having functions of displaying and installing an application, such as a mobile phone, a tablet personal computer, a laptop computer, a personal digital assistant (PDA), a Mobile Internet Device (MID), or a Wearable Device, etc.

In this embodiment, before the air interface signaling connection is established, the data message carrying the state transition data is sent to the network side device; the response message returned by the network side device in response to the data message is received, in which the data transmission indication is included in the response message. When the data message is the random access request message and the response message is the random access response message, and when the data transmission indication indicates transmitting, the uplink data packet is sent at the time-frequency domain position indicated by the uplink scheduling indication carried in the random access response message. Or the uplink data packet is sent to the network side device on the default physical channel. Since it may be controlled whether the uplink data packet is migrated to the RRC connection state for transmission, a latency requirement of service data may be effectively reduced, thus flexibility of network behaviors is improved.

The present disclosure solves a signaling load problem in the Internet of Things (IoT) scenario caused by the migration from an IDLE state of the terminal to a RRC state when a large number of mMTC (Massive Machine Type Communication) access networks to transmit bursty small data packets.

It should be noted that, in this embodiment, a state determination of whether the terminal supports the data transmission mode that does not perform state transition is added in the random access process, so that no additional signaling is required, thus the load of the network side device is not increased. Further, the existing random access process may not be changed, the network side device performs determination before sending the msg4, and then determines contents of the msg4 according to a result of the determination. Alternatively, after a device receives the msg4, the device first determines whether the terminal supports the data transmission mode in which the state transition is not performed. When the terminal supports the data transmission mode in which the state transition is not performed, the device sends the data message of the state transition data to the network side device, and then determines whether to transmit data before the signaling connection according to a result returned by the network side device.

Figure 3:
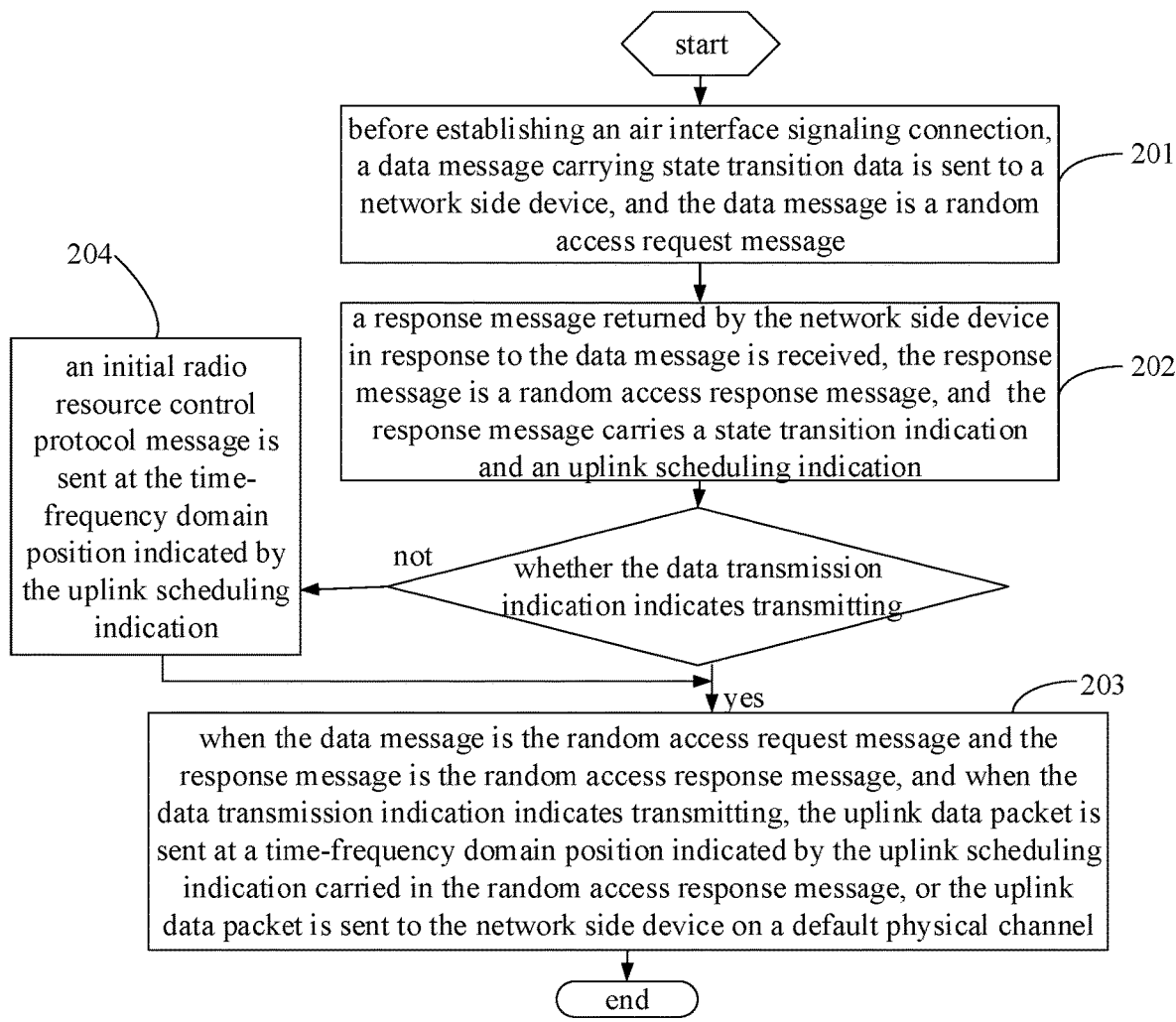
FIG. 3 is a second flowchart of a data transmission method according to a second embodiment of the present disclosure.

Further, referring to FIG. 3, based on the foregoing embodiment, after the foregoing step 202, the method further includes:

Step 204: When the data transmission indication indicates non-transmitting, an initial radio resource control protocol message is sent at the time-frequency domain position indicated by the uplink scheduling indication.

In this step, since the data transmission indication includes two schemes of non-transmitting and transmitting, when the data transmission indication is non-transmitting, an RRC connection is to be established, and an RRC connection procedure may be entered. Specifically, the initial radio resource control protocol message is sent at the time-frequency domain position indicated by the uplink scheduling indication, that is, the msg3 is sent, and then the network side device determines whether the terminal is allowed to establish the RRC connection, and returns a response of msg3 through msg4 to tell the terminal whether the establishment of the RRC connection is allowed. If allowed, the RRC connection may be established and the uplink data packet may be sent after the connection is established.

Further, a type of the data feature may be set according to actual requirements, for example, may be a determination condition of whether or not to support the data transmission mode in which the state transition is not performed, or a determination result of the determination condition, which are described in detail in following embodiments.

In one solution, it is determined by the terminal whether to support data transmission without state transition. For example, the state transition data includes a data transmission identifier, which includes an identifier carried by the random access request message or a random access preamble sequence carried by the random access request message.

In this solution, the terminal determines whether to support the data transmission mode that does not perform the state transition. The data transmission identifier is sent in two ways. When the identifier is used, a plaintext transmission mode is used. For example, a 1-bit identifier may be used. When the identifier is equal to 1, migration is indicated. When the identifier is equal to 0, non-migration is indicated. When the random access preamble sequence is used as the data transmission identifier, a cipher text transmission mode is used. Specifically, the random access preamble sequence includes a first type of random access preamble sequence for identifying migration and a second type of random access preamble sequence for identifying non-migration. Or an identifier bit for indicating data transmission is added to the random access preamble sequence (i.e., the identifier is superimposed on the random access preamble sequence). In this embodiment, since the data transmission identifier is transmitted using the cipher text mode, the security of data transmission is improved. For example, when the data transmission mode without state transition is not supported, the first type of random access preamble sequence is used for random access; when the data transmission mode without state transition is supported, the second type of random access preamble sequence is used for random access.

Figure 4:
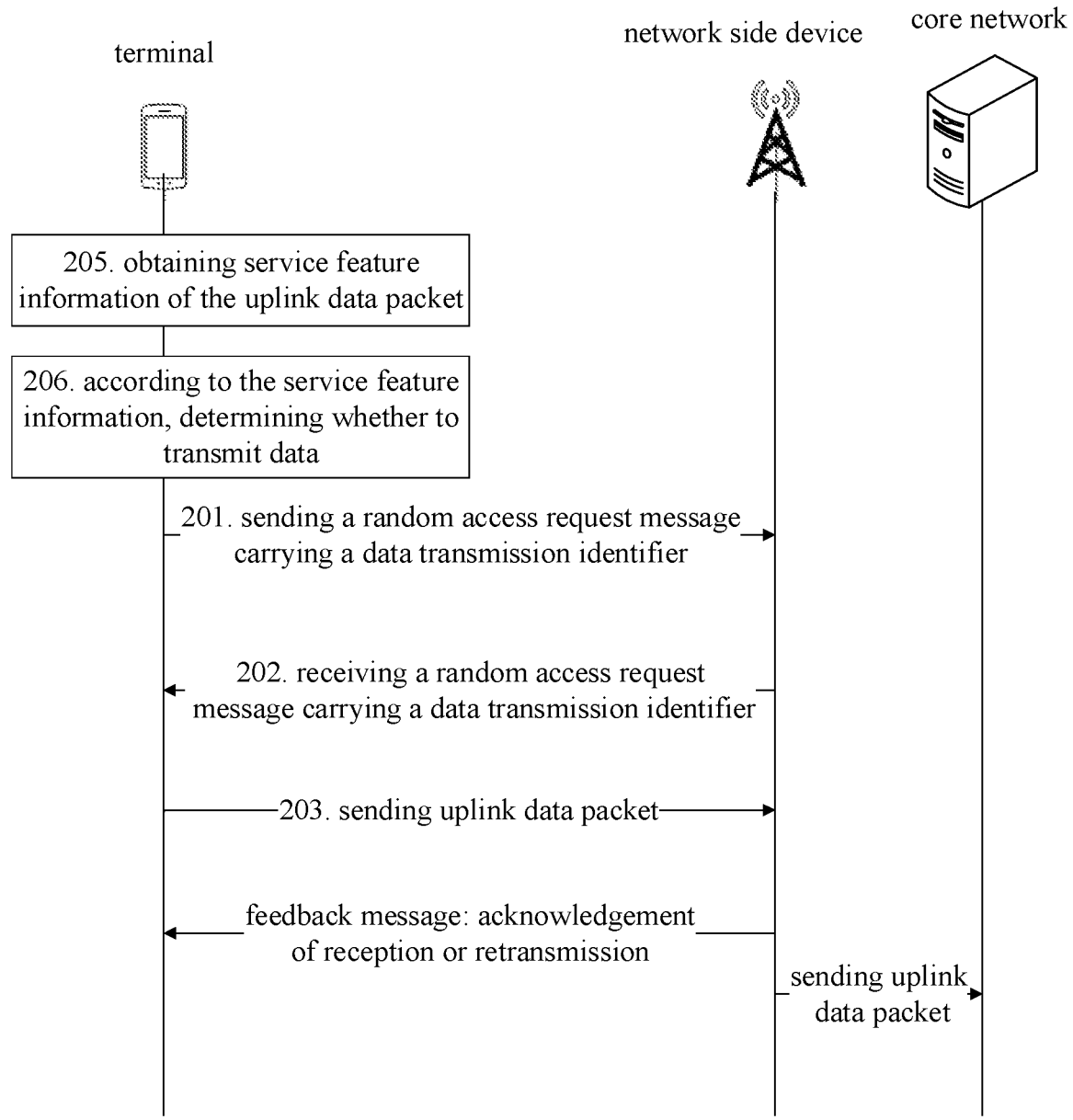
FIG. 4 is a third flowchart of a data transmission method according to a second embodiment of the present disclosure.

Further, referring to FIG. 4, before the foregoing step 201, the method further includes:

Step 205: Service feature information of the uplink data packet is obtained.

In this step, before the terminal sends the uplink data packet, the terminal may obtain the service feature information of the uplink data packet. Specifically, contents of the service feature information may be configured according to actual requirements. In this embodiment, the service feature information includes at least one of a service type, service cache information, a service quality requirement, or a service priority. The service type includes a smart water meter service, a car networking service, and an eMBB service, etc. The service cache information is the cache amount of the user's uplink data, for example, may be specific cache amount (such as XX bit). The service quality requirement is a Qos parameter, which may include a packet loss rate, maximum latency, etc. The service priority may be a high priority, a medium priority, and a low priority.

Step 206: It is determined, according to the service feature information, whether to transmit data.

In this step, the state transition data carried by the data message is a result of determining whether data transmission is required. After the service feature information is obtained, according to the service feature information, it is determined whether the data transmission mode that does not perform the state transition is supported according to a predefined rule. For example, when required latency is low and the cache amount of the user's uplink data is low, it may be determined to support data that does not perform state transition; when the required latency is high and the cache amount of the user's uplink data is high, it may be determined that the data that does not perform state transition is not supported. The rule for determining, based on the service feature information, whether the data transmission mode that does not perform the state transition is supported is not enumerated here.

It should be noted that, when the terminal determines, according to the service feature information, that the state transition is not performed is supported, the network side information acquired by the network side device may be used to determine whether to support the data transmission mode without state transition to optimize a network state. The network side information may include at least one of a network side load state, subscription data of the terminal, and operator configuration data. Specifically, the network side load state includes a load status of the network side device and/or a load status of the core network. The subscription data of the terminal includes a subscription type of the terminal and a subscription priority of the terminal. The operator configuration data includes whether to support the data transmission without state transition configured by the operator.

Figure 5:
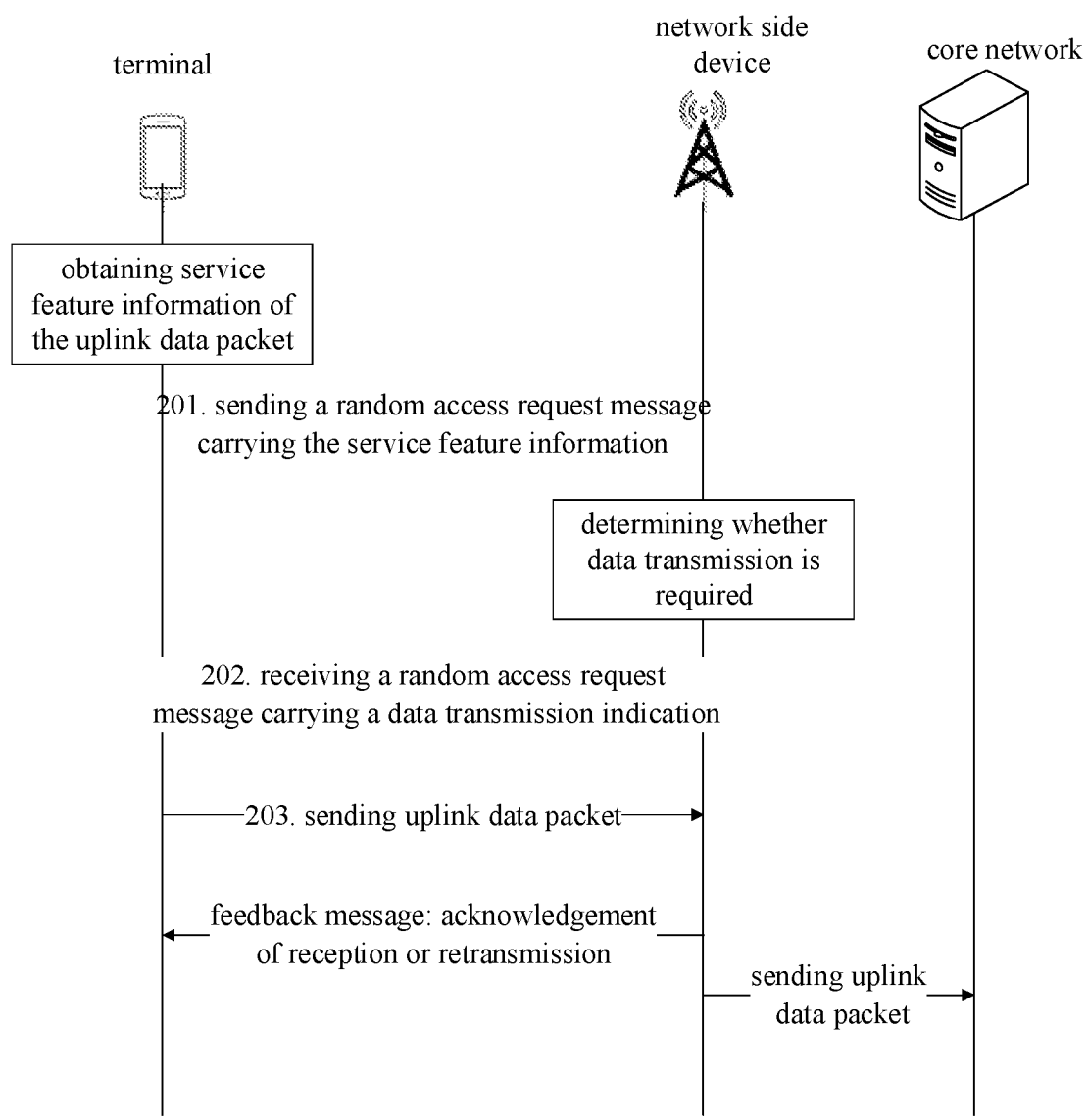
FIG. 5 is a third flowchart of a data transmission method according to a second embodiment of the present disclosure.

In another solution, referring to FIG. 5, the foregoing state transition data includes the service feature information. In this case, the service feature information is used by the network side device to determine whether data transmission is required according to the service feature information; or the network side device determines whether data transmission is required according to the service feature information and the network side information acquired by the network side device.

In this solution, before the terminal sends the uplink data packet, the terminal may obtain the service feature information of the uplink data packet. Specifically, contents of the service feature information may be configured according to actual requirements. In this embodiment, the service feature information includes at least one of a service type, service cache information, a service quality requirement, and a service priority. The service type includes a smart water meter service, a car networking service, and an eMBB service, etc. The service cache information is the cache amount of the user's uplink data, for example, may be specific cache amount (such as XX bit). The service quality requirement is a Qos parameter, which may include a packet loss rate, maximum latency, etc. The service priority may be a high priority, a medium priority, and a low priority.

It should be noted that each parameter in the service feature information of the terminal may be expressed as follows.

The service type may directly be represented by a service type.

The service cache information is represented by a cache amount (such as N bit) or a cache level (high, medium, low, or a level number corresponding to the amount of data to be sent (for example, 1 to 100 bit are numbered as group 1, which is represented by the group number 1)).

The service quality requirement is represented by a service quality parameter feature (such as low/high latency, small/large data packet), or by a group number of the service quality parameter feature (such as QCI serial number), or by the packet loss rate and maximum allowable latency (i.e., implicit).

The service priority is represented by a high priority, a medium priority, and a low priority.

After the service feature information is sent to the network side device, the network side device determines whether to support the data transmission mode without state transition according to the service feature information. The rule for determining whether to support the data transmission mode that does not perform the state transition may be the same as that for the terminal to make determination. In this embodiment, in order to optimize the network environment, the network side information acquired by the network side device may also be used for determination. Specifically, the network side information may include at least one of a network side load state, subscription data of the terminal, and operator configuration data. In this case, the network side load state includes a load status of the network side device and/or a load status of the core network. The subscription data of the terminal includes a subscription type of the terminal and a subscription priority of the terminal. The operator configuration data includes whether to support the data transmission without state transition configured by the operator.

Figure 6:
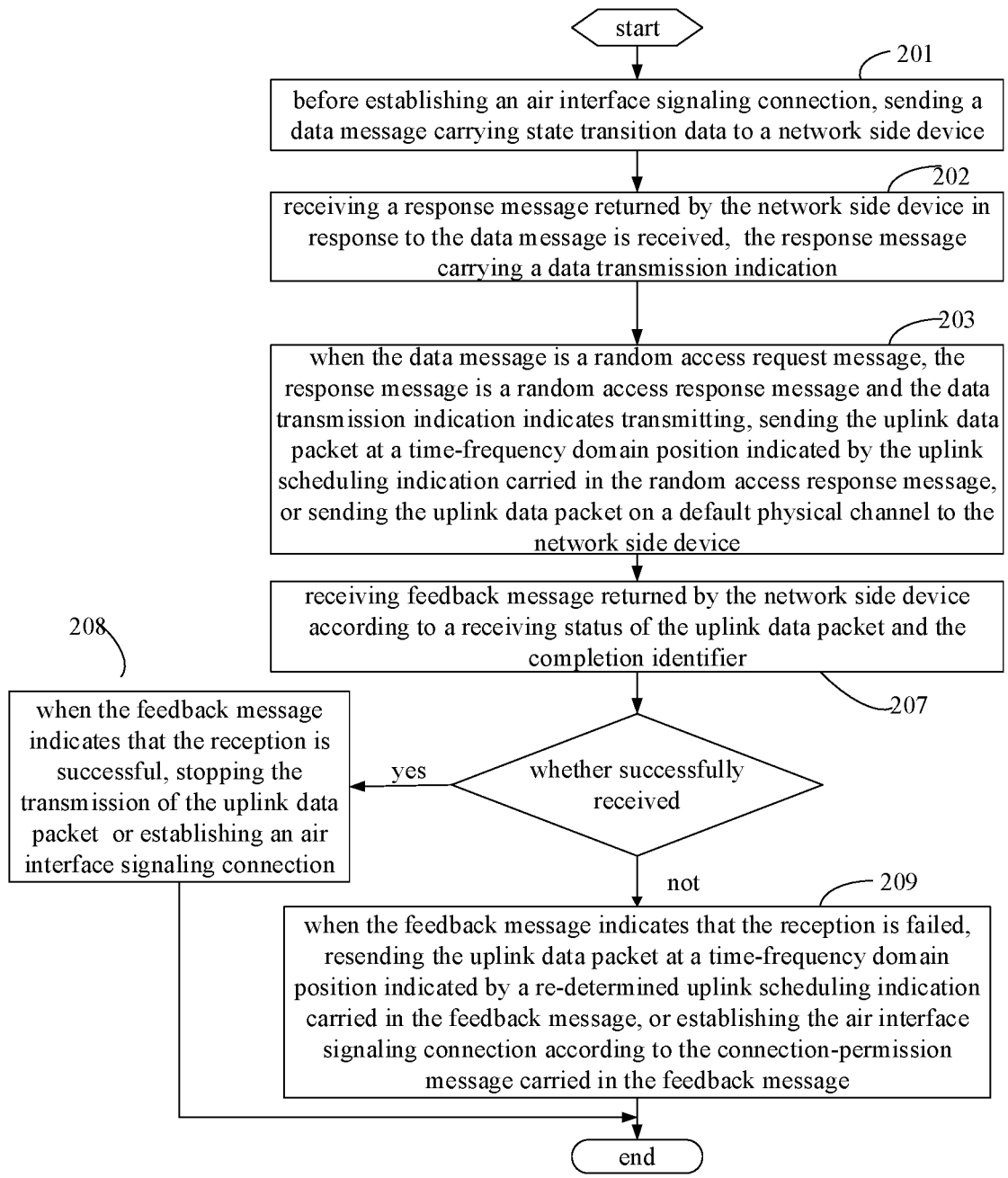
FIG. 6 is a fourth flowchart of a data transmission method according to a second embodiment of the present disclosure.

Further, referring to FIG. 6, the uplink data packet carries a completion identifier for identifying whether the transmission of the uplink data packet is completed, and after the step 203, the method further includes:

Step 207: A feedback message returned by the network side device according to a receiving status of the uplink data packet and the completion identifier is received.

In this step, a signaling type of the feedback message may be set according to actual requirements. In this embodiment, optionally, the feedback message is the foregoing msg4.

That is, in the present embodiment, the uplink data packet is placed in msg3 for transmission. It can be understood that the mode in which the uplink data packet is placed in msg3 for transmission may be configured according to actual requirements. Optionally, in the embodiment, the foregoing step 203 includes following operations. The uplink data packet is placed in a Media Access Control (MAC) layer data packet or in radio resource control protocol layer signaling in the media access control layer data packet, and is sent at the time-frequency domain position indicated by the uplink scheduling indication. For example, the uplink data packet is placed in an initial radio resource control protocol message, and a connection reason for the initial radio resource control protocol message is configured as transmission of the uplink data packet. The initial radio resource control protocol message may be an RRC Connection Request message or an RRC Connection Resume Request message.

If the uplink data packet is successfully received, a feedback message in response to the initial radio resource control protocol message in msg4 may include RRC Connection Reject (rejection) or RRC Connection Resume Reject (resume rejection), and a rejection reason as 'data transmission is completed' is included.

If the uplink data packet is not received successfully and it is determined to perform the state transition, the feedback message in response to the initial radio resource control protocol message in msg4 may include RRC Connection Setup (permission) or RRC Connection Resume (resume permission), and include a reason for allowing the establishment of the connection.

If the uplink data packet is not received successfully and it is determined to retransmit the uplink data packet, the feedback message in response to the initial radio resource control protocol message in msg4 may include RRC Connection Reject (rejection) or RRC Connection Resume Reject (resume rejection), and include a rejection reason as "retransmission", and carry a reallocated time-frequency domain position (i.e., slot resource).

Step 208: When the feedback message indicates that the reception is successful, the transmission of the uplink data packet is stopped or an air interface signaling connection is established.

In this step, whether the reception is successful may be determined according to the contents of the received feedback message. When the reception is successful, if the transmission of the uplink data packet is completed, the transmission of the uplink data packet may be stopped; if the transmission of the uplink data packet is not completed, the air interface signaling connection may be established.

Specifically, in the embodiment, the feedback message returned by the network side device according to the receiving status of the uplink data packet and the completion identifier may include: when the uplink data packet is successfully received and when the completion identifier is completion, the feedback message carries a rejection message for canceling the initial radio resource control protocol; when the completion identifier is incompletion, the feedback message carries a connection-permission message for establishing the initial radio resource control protocol.

The foregoing completion identifier may be set according to an actual situation, for example, it may be identified whether the uplink data packet is the last data packet. When the uplink data packet is the last data packet, it is indicated that the transmission is completed.

For example, in practice, when the number of uplink data packets sent is relatively small and the uplink data packets may be sent at once, the uplink data packets may directly be sent. When a large number of uplink data packets are sent, a certain number of uplink data packets may be preferentially transmitted in a non-RRC connection state and a subsequent uplink data packet is sent after the RRC connection is established. Therefore, the transmission of network data packets may be well controlled.

Step 209: When the feedback message indicates that the reception is failed, the uplink data packet is resent at a time-frequency domain position indicated by a re-determined uplink scheduling indication carried in the feedback message, or the air interface signaling connection is established according to the connection-permission message carried in the feedback message.

In this step, establishing the air interface signaling connection means to establish a radio resource control protocol connection. When the receiving fails, the network side device may determine whether to retransmit data or perform state transition according to actual conditions (for example, the load status on the network side). When it is determined that the retransmission is performed, the re-determined uplink scheduling indication may be carried in the feedback message, and then the terminal resends the uplink data packet at the time-frequency domain position indicated by the re-determined uplink scheduling indication carried in the feedback message. Or, when it is determined to change a status of the RRC connection, the connection-permission message, i.e., the foregoing RRC Connection Setup or RRC Connection Resume, is carried in the feedback message, so that the terminal initiates the process of establishing the RRC. In this embodiment, when the network side device fails to receive the uplink data packet, the network side device may comprehensively consider the state of the network side, and determine to perform the retransmission or the state transition, thus the flexibility of the network control is improved.

It should be noted that when performing random access, multiple terminals may select a same random access preamble sequence, which may cause interference when the network side device receives messages, and finally form a random access conflict. Considering that increase in the number of 5G terminals may increase a random access preamble sequence space, because the possibility of conflict of random preambles may not be proportional to the number of 5G terminals. However, there may be a conflict, which is resolved as follows.

If the terminal does not blindly detect its own RA-RNTI in a Physical Downlink Control Channel (PDCCH) during the process of receiving the msg2, it is indicated that transmission of msg1 preamble fails, and the terminal sends the random preamble again according to a preset mode.

If the terminal detects its own RA-RNTI in the PDCCH and detects the RAPID (random access preamble sequence) corresponding to the terminal in the MAC (Medium Access Control Layer) data packet during the process of receiving the msg2, it is indicated that the msg1 preamble is successfully transmitted.

If a base station rejects a transmission request due to the load, the terminal sends the random access again according to a configuration fallback value of the MAC data packet.

If the base station allows the transmission request, the terminal sends the uplink data packet at the time-frequency domain position indicated in msg2. If multiple terminals use the same random access preamble sequence and time-frequency domain position, the time-frequency domain positions allocated in msg2 and used by the multiple terminals are the same, so that a conflict occurs. The terminal determines whether the uplink data packet sent by the terminal is successfully received by receiving msg4. The terminal retransmits the uplink data packet when the uplink data packet is not successfully received. The network side device may consider retransmission or state transition according to the reception condition of the uplink data packet.

It should be noted that, after the terminal determines, according to the service feature information, whether to support the data transmission mode without state transition, a mode of sending the identifier to the network side device belongs to a determination of the terminal; the terminal directly sends the service feature information to the network side device, a mode in which the network side device determines whether to support data transmission without state transition belongs to a determination of the base station. The service feature information may be directly obtained in the terminal, and whether the data transmission mode without state transition is supported may be determined before the access process is triggered. Therefore, the mode based on the determination of the terminal may reduce the time for data transmission. That is to say, in the present embodiment, the determination made by the terminal is faster than the determination made by the base station.

A Third Embodiment

Figure 7:
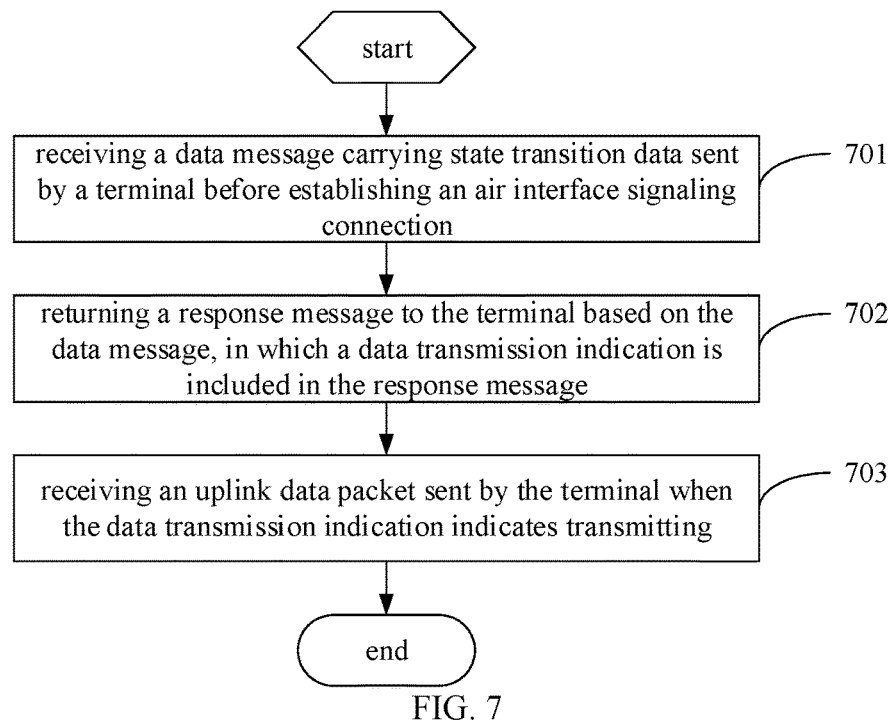
FIG. 7 is a flowchart of a data transmission method according to a third embodiment of the present disclosure.

Referring to FIG. 7, which is a flowchart of a data transmission method according to an embodiment of the present disclosure. As shown in FIG. 7, the method includes following steps.

Step 701: A data message carrying state transition data sent by a terminal before establishing an air interface signaling connection is received.

In the embodiment of the present disclosure, the air interface signaling is a data transmission signaling protocol from end to end. For example, an existing air interface signaling includes radio resource control protocol signaling. The radio resource control protocol is RRC (Radio Resource Control), and the state transition data is a data feature indicating whether or not to support a data transmission mode in which state transition is not performed. The state transition refers to a change in a connection state of the RRC. Specifically, the state transition means changing from disestablishment of the RRC connection to establishment of the RRC connection. A type of the data feature may be set according to actual requirements, for example, may be a determination condition of whether or not to support the data transmission mode in which the state transition is not performed, or a determination result of the determination condition, which are described in detail in following embodiments. The above network side device refers to a base station.

For example, when a mobile terminal does not generate service data for a long time, the mobile terminal may automatically disconnect the RRC connection with the core network. When uplink service data (uplink data packet) is sent again, the RRC connection may be established to send the data packet to the core network. Specifically, the service data may be any type, such as a smart water meter service, a car networking service, or an eMBB service, etc.

Step 702: A response message is returned to the terminal based on the data message, in which a data transmission indication is included in the response message.

In this step, there are two states: transmitting or non-transmitting. After receiving the data message, the network side device may respond to the data message. The data transmission indication is included in the response message. Specifically, a response mode matches contents of the data message. Since the state transition data in the data message may be in multiple forms, multiple response modes may be correspondingly configured. For example, when the state transition data is the determination condition of whether or not to support the data transmission mode in which the state transition is not performed, the network side device determines, according to the determination condition, whether the terminal supports data transmission when the state transition is not performed, thereby sending the data transmission indication. When the state transition data is the determination result of the determination condition, the data transmission indication may be directly sent according to the determination result. Or network side information acquired by the network side device may be used to determine whether the terminal is allowed to transmit data without state transition, and then the data transmission indication is sent.

Step 703: An uplink data packet sent by the terminal when the data transmission indication indicates transmitting is received.

In this step, after the terminal receives the response message from the network side device, the terminal performs a corresponding operation according to the data transmission indication in the response message. Specifically, when the data transmission indication indicates transmitting, the uplink data packet may be sent to the network side device. After receiving the uplink data packet, the network side device sends the uplink data packet to the core network, thereby completing transmission of the uplink data packet.

It can be understood that the determination rule of the data transmission mode that does not support the state transition of different service data may be configured according to actual requirements, which is not further limited herein.

In the embodiment of the present disclosure, the terminal may be any mobile terminal having functions of displaying and installing an application, such as a mobile phone, a tablet personal computer, a laptop computer, a personal digital assistant (PDA), a Mobile Internet Device (MID), or a Wearable Device, etc.

In this embodiment, before the air interface signaling connection is established, the data message carrying the state transition data sent by the terminal is received; the response message is returned to the terminal based on the data message, in which the data transmission indication is included in the response message. The uplink data packet sent by the terminal when the data transmission indication indicates transmitting is received. Since it may be controlled whether the uplink data packet is migrated to the RRC connection state for transmission, a latency requirement of service data may be effectively reduced, thus flexibility of network behaviors is improved.

The present disclosure solves a signaling load problem in the Internet of Things (IoT) scenario caused by the migration from an IDLE state of the terminal to a RRC state when a large number of mMTC (Massive Machine Type Communication) access networks to transmit bursty small data packets.

A Fourth Embodiment

Figure 8:
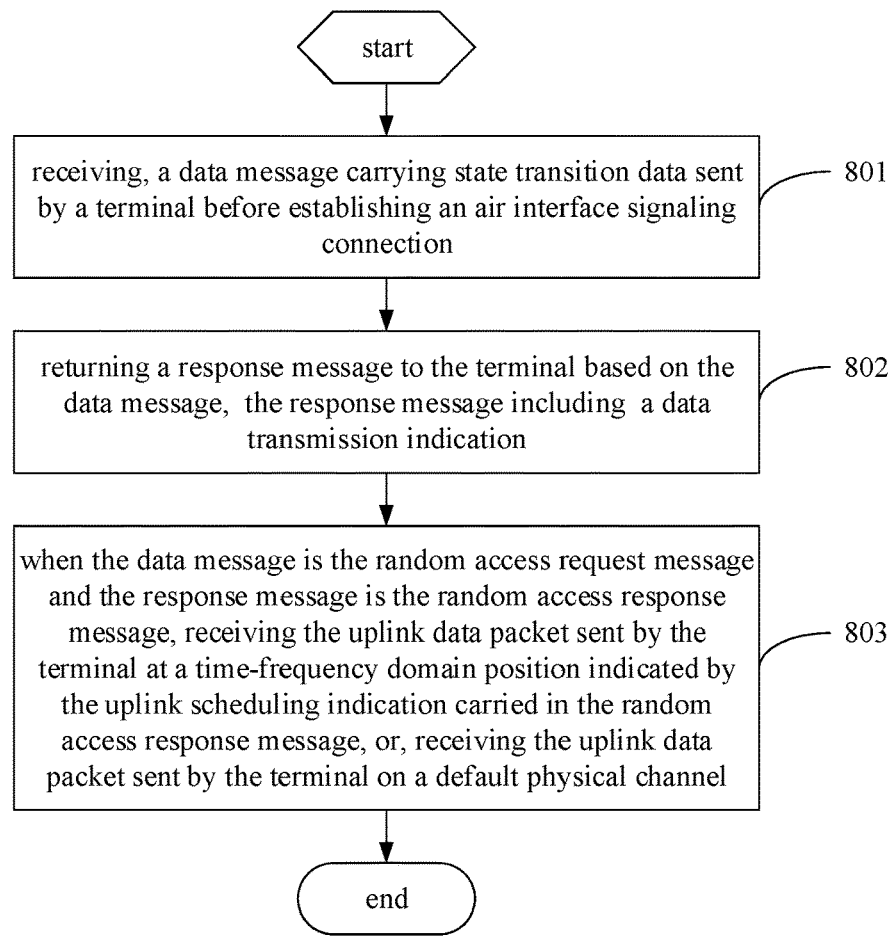
FIG. 8 is a first flowchart of a data transmission method according to a fourth embodiment of the present disclosure.

Referring to FIG. 8, which is a flowchart of a data transmission method according to an embodiment of the present disclosure. As shown in FIG. 8, the method includes following steps.

Step 801: A data message carrying state transition data sent by a terminal before establishing an air interface signaling connection is received.

In the embodiment of the present disclosure, the air interface signaling is a data transmission signaling protocol from end to end. For example, an existing air interface signaling includes radio resource control protocol signaling. The radio resource control protocol is RRC (Radio Resource Control), and the state transition data is a data feature indicating whether or not to support a data transmission mode in which state transition is not performed. The state transition refers to a change in a connection state of the RRC. Specifically, the state transition means changing from disestablishment of the RRC connection to establishment of the RRC connection. A type of the data feature may be set according to actual requirements, for example, may be a determination condition of whether or not to support the data transmission mode in which the state transition is not performed, or a determination result of the determination condition, which are described in detail in following embodiments. The above network side device refers to a base station.

In this embodiment, the data message is a random access request message. That is, during a random access procedure, it is determined whether to establish a radio resource control protocol connection to send an uplink data packet. Specifically, msg1 to msg4 are included in the random access procedure, in which msg1 is the random access request message, msg2 is a random access response message replied to the random access request message, msg3 is an initial RRC message, and msg4 is a response message of the initial RRC message. In this embodiment, the state transition data is carried in the msg1 sent by the terminal.

For example, when a mobile terminal does not generate service data for a long time, the mobile terminal may automatically disconnect the RRC connection with the core network. When uplink service data (uplink data packet) is sent again, the RRC connection may be established to send the data packet to the core network. Specifically, the service data may be any type, such as a smart water meter service, a car networking service, or an eMBB service, etc.

Step 802: A response message is returned to the terminal based on the data message, in which a data transmission indication is included in the response message.

In this step, the data transmission indication includes two states: transmitting or non-transmitting. After receiving the data message, the network side device may respond to the data message. The data transmission indication is included in the response message. Specifically, a response mode matches contents of the data message. Since the state transition data in the data message may be in multiple forms, multiple response modes may be correspondingly configured. For example, when the state transition data is the determination condition of whether or not to support the data transmission mode in which the state transition is not performed, the network side device determines, according to the determination condition, whether the terminal supports data transmission when the state transition is not performed, thereby sending the data transmission indication. When the state transition data is the determination result of the determination condition, the data transmission indication may be directly sent according to the determination result. Or network side information acquired by the network side device may be used to determine whether the terminal is allowed to transmit data without state transition, and then the data transmission indication is sent. For example, when the network side device does not support data transmission without state transition, the data transmission indication may be directly configured as non-transmitting.

It should be noted that the random access response message further includes uplink timing TA used as uplink synchronization, a temporary identifier C-RNTI used for temporarily identifying a UE, signaling P used as uplink power control, and an uplink scheduling indication (UL grant) used as msg3 scheduling. A moment for transmitting the uplink data packet may be controlled according to a value of each parameter in the random access response message.

Step 803: When the data message is the random access request message and the response message is the random access response message, the uplink data packet sent by the terminal at a time-frequency domain position indicated by the uplink scheduling indication carried in the random access response message is received. Or the uplink data packet sent by the terminal on a default physical channel is received.

In this step, after the terminal receives the response message from the network side device, the terminal performs a corresponding operation according to the data transmission indication in the response message. Specifically, when the data transmission indication indicates transmitting, the uplink data packet may be sent to the network side device. After receiving the uplink data packet, the network side device sends the uplink data packet to the core network, thereby completing transmission of the uplink data packet.

It can be understood that the determination rule of the data transmission mode that does not support the state transition of different service data may be configured according to actual requirements, which is not further limited herein.

It can be understood that a mode for sending the uplink data packet may be configured according to actual requirements, for example, the uplink data packet may be sent on the default physical channel, or may be sent at the time-frequency domain position indicated by the uplink scheduling indication. The default physical channel refers to a physical channel (a pre-configured physical channel) known by the terminal. Specifically, the method for transmitting the uplink data packet may be configured according to actual requirements. For example, the random access response message may be configured to include a selection identifier for indicating the mode of sending the uplink data packet. In addition, when the uplink scheduling indication is not included in the response message, the default physical channel is used to send the uplink data packet by default.

In the embodiment of the present disclosure, the mobile terminal may be any mobile terminal having functions of displaying and installing an application, such as a mobile phone, a tablet personal computer, a laptop computer, a personal digital assistant (PDA), a Mobile Internet Device (MID), or a Wearable Device, etc.

In this embodiment, before the air interface signaling connection is established, the data message carrying the state transition data sent by the terminal is received; the response message is returned to the terminal based on the data message, in which the data transmission indication is included in the response message. When the data message is the random access request message and the response message is the random access response message, the uplink data packet sent by the terminal at the time-frequency domain position indicated by the uplink scheduling indication carried in the random access response message is received. Or the uplink data packet sent by the terminal on the default physical channel is received. Since it may be controlled whether the uplink data packet is migrated to the RRC connection state for transmission, a latency requirement of service data may be effectively reduced, thus flexibility of network behaviors is improved.

The present disclosure solves a signaling load problem in the Internet of Things (IoT) scenario caused by the migration from an IDLE state of the terminal to a RRC state when a large number of mMTC (Massive Machine Type Communication) access networks to transmit bursty small data packets.

It should be noted that, in this embodiment, a state determination of whether the terminal supports the data transmission mode that does not perform state transition is added in the random access process, so that no additional signaling is required, thus the load of the network side device is not increased. Further, the existing random access process may not be changed, the network side device performs determination before sending the msg4, and then determines contents of the msg4 according to a result of the determination. Alternatively, after a device receives the msg4, the device first determines whether the terminal supports the data transmission mode in which the state transition is not performed. When the terminal supports the data transmission mode in which the state transition is not performed, the device sends the data message of the state transition data to the network side device, and then determines whether to transmit data before the signaling connection according to a result returned by the network side device.

Further, a type of the data feature may be set according to actual requirements, for example, may be a determination condition of whether or not to support the data transmission mode in which the state transition is not performed, or a determination result of the determination condition, which are described in detail in following embodiments.

In one solution, the foregoing state transition data includes a data transmission identifier, and before step 802 the method further includes:

determining whether data transmission is required according to the data transmission identifier carried in the random access request message; or determining whether data transmission is required according to the data transmission identifier carried in the random access request message and the acquired network side information.

In this step, when determining whether data transmission is required according to the data transmission identifier carried in the random access request message, if the terminal determines that data transmission without state transition is supported, the data transmission indication is directly returned as transmitting. When determining whether data transmission is required according to the data transmission identifier carried in the random access request message and the acquired network side information, if the terminal determines that data transmission without state transition is supported, it is determined again according to the network side information whether data transmission is required.

The network side information may include at least one of a network side load state, subscription data of the terminal, and operator configuration data. Specifically, the network side load state includes a load status of the network side device and/or a load status of the core network. The subscription data of the terminal includes a subscription type of the terminal and a subscription priority of the terminal. The operator configuration data includes whether to support the data transmission without state transition configured by the operator.

Specifically, before the terminal sends the uplink data packet, the terminal may obtain the service feature information of the uplink data packet. Contents of the service feature information may be configured according to actual requirements. In this embodiment, the service feature information includes at least one of a service type, service cache information, a service quality requirement, and a service priority. The service type includes a smart water meter service, a car networking service, and an eMBB service, etc. The service cache information is the cache amount of the user's uplink data, for example, may be specific cache amount (such as XX bit). The service quality requirement is a Qos parameter, which may include a packet loss rate, maximum latency, etc. The service priority may be a high priority, a medium priority, and a low priority.

According to the service feature information, it is determined whether the data transmission mode that does not perform the state transition is supported according to a predefined rule. For example, when required latency is low and the cache amount of the user's uplink data is low, it may be determined to support the data transmission mode that does not perform state transition; when the required latency is high and the cache amount of the user's uplink data is high, it may be determined that the data transmission mode that does not perform state transition is not supported. The rule for determining, based on the service feature information, whether the data transmission mode that does not perform the state transition is supported is not enumerated here.

In this solution, the terminal determines whether the state transition is performed. The data transmission identifier is sent in two ways. When an identifier is used, a plaintext transmission mode is used. For example, a 1-bit identifier may be used. When the identifier is equal to 1, migration is indicated. When the identifier is equal to 0, non-migration is indicated. When a random access preamble sequence is used as the data transmission identifier, a cipher text transmission mode is used. Specifically, the random access preamble sequence includes a first type of random access preamble sequence for identifying migration and a second type of random access preamble sequence for identifying non-migration. Or an identifier bit for indicating state transition is added to the random access preamble sequence (i.e., the identifier is superimposed on the random access preamble sequence). In this embodiment, since the data transmission identifier is transmitted using the cipher text mode, the security of data transmission is improved. For example, when the data transmission mode without state transition is not supported, the first type of random access preamble sequence is used for random access; when the data transmission mode without state transition is supported, the second type of random access preamble sequence is used for random access.

Figure 9:
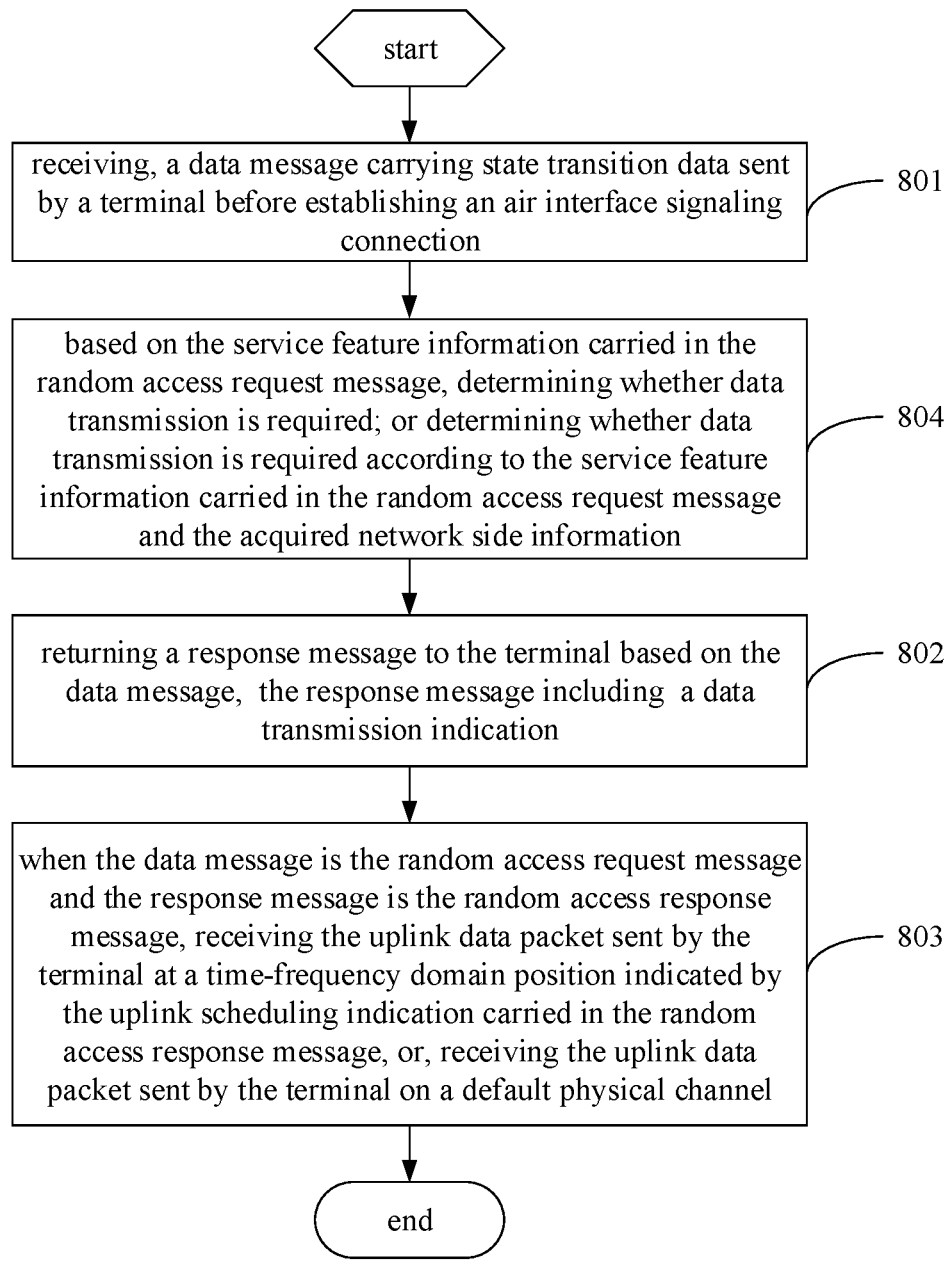
FIG. 9 is a second flowchart of a data transmission method according to a fourth embodiment of the present disclosure.

In another solution, the foregoing state transition data includes the service feature information. As shown in FIG. 9, before step 802, the method further includes following operations.

Step 804: It is determined, based on the service feature information carried in the random access request message, whether data transmission is required; or it is determined whether data transmission is required according to the service feature information carried in the random access request message and the acquired network side information.

In this solution, before the terminal sends the uplink data packet, the terminal may obtain the service feature information of the uplink data packet. Specifically, contents of the service feature information may be configured according to actual requirements. In this embodiment, the service feature information includes at least one of a service type, service cache information, a service quality requirement, and a service priority. The service type includes a smart water meter service, a car networking service, and an eMBB service, etc. The service cache information is the cache amount of the user's uplink data, for example, may be specific cache amount (such as XX bit). The service quality requirement is a Qos parameter, which may include a packet loss rate, maximum latency, etc. The service priority may be a high priority, a medium priority, and a low priority.

It should be noted that each parameter in the service feature information of the terminal may be expressed as follows.

The service type may directly be represented by a service type.

The service cache information is represented by a cache amount (such as N bit) or a cache level (high, medium, low, or a level number corresponding to the amount of data to be sent (for example, 1 to 100 bit are numbered as group 1, which is represented by the group number 1)).

The service quality requirement is represented by a service quality parameter feature (such as low/high latency, small/large data packet), or by a group number of the service quality parameter feature (such as QCI serial number), or by the packet loss rate and maximum allowable latency (i.e., implicit).

The service priority is represented by a high priority, a medium priority, and a low priority.

After the service feature information is sent to the network side device, the network side device determines, according to the service feature information, whether to support that the state transition is not performed. The rule for determining whether to support the data transmission mode that does not perform the state transition may be the same as that for the terminal to make determination. In this embodiment, in order to optimize the network environment, the network side information acquired by the network side device may also be used for determination. Specifically, the network side information may include at least one of a network side load state, subscription data of the terminal, and operator configuration data. In this case, the network side load state includes a load status of the network side device and/or a load status of the core network. The subscription data of the terminal includes a subscription type of the terminal and a subscription priority of the terminal. The operator configuration data includes whether to support the data transmission without state transition configured by the operator.

Figure 10:
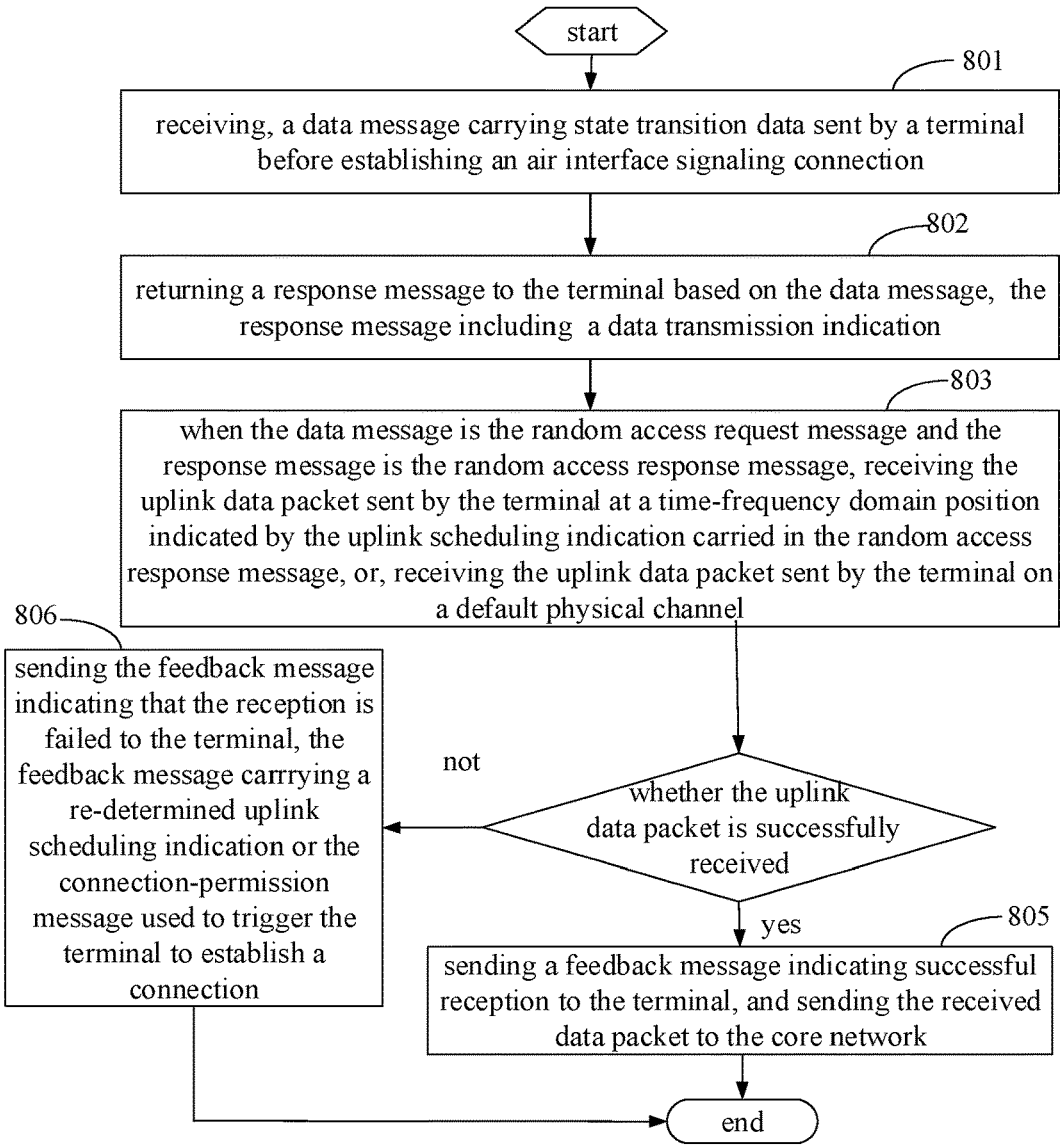
FIG. 10 is a third flowchart of a data transmission method according to a fourth embodiment of the present disclosure.

Further, referring to FIG. 10, after the foregoing step 803, the method further includes following operations.

Step 805: When the uplink data packet is successfully received, a feedback message indicating successful reception is sent to the terminal, and the received data packet is sent to the core network.

In this embodiment, whether the reception is successful may be determined according to the contents of the received feedback message. When the reception is successful, if the transmission of the uplink data packet is completed, the transmission of the uplink data packet may be stopped; if the transmission of the uplink data packet is not completed, the air interface signaling connection may be established.

Specifically, in this embodiment, the uplink data packet carries a completion identifier for identifying whether the transmission of the uplink data packet is completed. When the received uplink data packet is located in the initial radio resource control protocol message and the reception of the uplink data packet is failed, the feedback message carries a connection-permission message for establishing the initial radio resource control protocol (RRC Connection Reject or RRC Connection Resume Reject); when the received uplink data packet is located in the initial radio resource control protocol message and the uplink data packet is successfully received, if the completion identifier is completion, the feedback message carries a rejection message for canceling the initial radio resource control protocol (RRC Connection Reject or RRC Connection Resume Reject); if the completion identifier is incompletion, the feedback message carries the connection-permission message for establishing the initial radio resource control protocol.

The foregoing completion identifier may be set according to an actual situation, for example, it may be identified whether the uplink data packet is the last data packet. When the uplink data packet is the last data packet, it is indicated that the transmission is completed.

For example, in practice, when the number of uplink data packets sent is relatively small and the uplink data packets may be sent at once, the uplink data packets may directly be sent. When a large number of uplink data packets are sent, a certain number of uplink data packets may be preferentially transmitted in a non-RRC connection state and a subsequent uplink data packet is sent after the RRC connection is established. Therefore, the transmission of network data packets may be well controlled.

In this step, a signaling type of the feedback message may be set according to actual requirements. In this embodiment, optionally, the feedback message is the foregoing msg4. That is, in the present embodiment, the uplink data packet is placed in msg3 for transmission. It can be understood that the mode in which the uplink data packet is placed in msg3 for transmission may be configured according to actual requirements. Optionally, in the embodiment, the foregoing step 203 includes following operations. The uplink data packet is placed in a Media Access Control (MAC) layer data packet or in radio resource control protocol layer signaling in the media access control layer data packet, and is sent at the time-frequency domain position indicated by the uplink scheduling indication. For example, the uplink data packet is placed in an initial radio resource control protocol message, and a connection reason for the initial radio resource control protocol message is configured as transmission of the uplink data packet. The initial radio resource control protocol message may be an RRC Connection Request message or an RRC Connection Resume Request message.

If the uplink data packet is successfully received, a feedback message in response to the initial radio resource control protocol message in msg4 may include RRC Connection Reject (rejection) or RRC Connection Resume Reject (resume rejection), and a rejection reason as 'data transmission is completed' is included.

If the uplink data packet is not received successfully and it is determined to perform the state transition, the feedback message in response to the initial radio resource control protocol message in msg4 may include RRC Connection Setup (permission) or RRC Connection Resume (resume permission), and include a reason for allowing the establishment of the connection.

If the uplink data packet is not received successfully and it is determined to retransmit the uplink data packet, the feedback message in response to the initial radio resource control protocol message in msg4 may include RRC Connection Reject (rejection) or RRC Connection Resume Reject (resume rejection), and include a rejection reason as "retransmission", and carry a reallocated time-frequency domain position (i.e., slot resource).

Step 806: When the reception of the uplink data packet is failed, the feedback message indicating that the reception is failed is sent to the terminal, in which a re-determined uplink scheduling indication or the connection-permission message used to trigger the terminal to establish a connection is carried in the feedback message.

In this step, establishing the air interface signaling connection means to establish a radio resource control protocol connection. When the receiving fails, the network side device may determine whether to retransmit data or perform state transition according to actual conditions (for example, the load status on the network side). When it is determined that the retransmission is performed, the re-determined uplink scheduling indication may be carried in the feedback message, and then the terminal resends the uplink data packet at the time-frequency domain position indicated by the re-determined uplink scheduling indication carried in the feedback message. Or, when it is determined to change a status of the RRC connection, the connection-permission message, i.e., the foregoing RRC Connection Setup or RRC Connection Resume, is carried in the feedback message, so that the terminal initiates the process of establishing the RRC. In this embodiment, when the network side device fails to receive the uplink data packet, the network side device may comprehensively consider the state of the network side, and determine to perform the retransmission or the state transition, thus the flexibility of the network control is improved.

It should be noted that when performing random access, multiple terminals may select a same random access preamble sequence, which may cause interference when the network side device receives messages, and finally form a random access conflict. Considering that increase in the number of 5G terminals may increase a random access preamble sequence space, because the possibility of conflict of random preambles may not be proportional to the number of 5G terminals. However, there may be a conflict, which is resolved as follows.

If the terminal does not blindly detect its own RA-RNTI in a Physical Downlink Control Channel (PDCCH) during the process of receiving the msg2, it is indicated that transmission of msg1 preamble fails, and the terminal sends the random preamble again according to a preset mode.

If the terminal detects its own RA-RNTI in the PDCCH and detects the RAPID (random access preamble sequence) corresponding to the terminal in the MAC (Medium Access Control Layer) data packet during the process of receiving the msg2, it is indicated that the msg1 preamble is successfully transmitted.

If a base station rejects a transmission request due to the load, the terminal sends the random access again according to a configuration fallback value of the MAC data packet.

If the base station allows the transmission request, the terminal sends the uplink data packet at the time-frequency domain position indicated in msg2. If multiple terminals use the same random access preamble sequence and time-frequency domain position, the time-frequency domain positions allocated in msg2 and used by the multiple terminals are the same, so that a conflict occurs. The terminal determines whether the uplink data packet sent by the terminal is successfully received by receiving msg4. The terminal retransmits the uplink data packet when the uplink data packet is not successfully received. The network side device may consider retransmission or state transition according to the reception condition of the uplink data packet.

In this embodiment, before the radio resource control protocol connection is established, the data message carrying the state transition data sent by the terminal is received; the response message is returned to the terminal based on the data message, in which the state transition indication is included in the response message. The uplink data packet sent by the terminal when the state transition indication is non-migration is received. Since it may be controlled whether the uplink data packet is migrated to the RRC connection state for transmission, a latency requirement of service data may be effectively reduced, thus flexibility of network behaviors is improved.

A Fifth Embodiment

Figure 11:
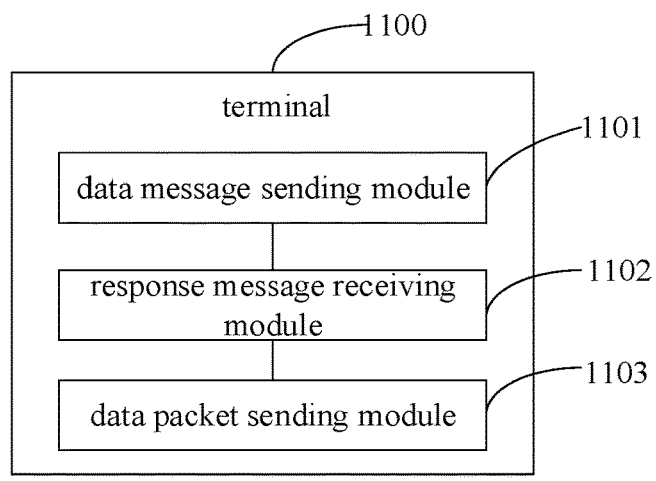
FIG. 11 is a first structural diagram of a terminal according to a fifth embodiment of the present disclosure.

Referring to FIG. 11, which is a structural diagram of a terminal provided by an embodiment of the present disclosure, the terminal may implement details of the data transmission method in the first embodiment and the second embodiment, and achieve the same effects. As shown in FIG. 11, the terminal 1100 includes: a data message sending module 1101, a response message receiving module 1102, and a data packet sending module 1103.

The data message sending module 1101 is to send a data message carrying state transition data to a network side device before an air interface signaling connection is established.

The response message receiving module 1102 is to receive a response message returned by the network side device in response to the data message, wherein a data transmission indication is included in the response message.

The data packet sending module 1103 is to send an uplink data packet to the network side device when the data transmission indication indicates transmitting.

Optionally, the data packet sending module 1103 is to, when the data message is a random access request message and the response message is a random access response message, send the uplink data packet at a time-frequency domain position indicated by an uplink scheduling indication carried in the random access response message; or send the uplink data packet to the network side device on a default physical channel.

Optionally, a selection identifier for indicating a mode of sending the uplink data packet is included in the random access response message.

Figure 12:
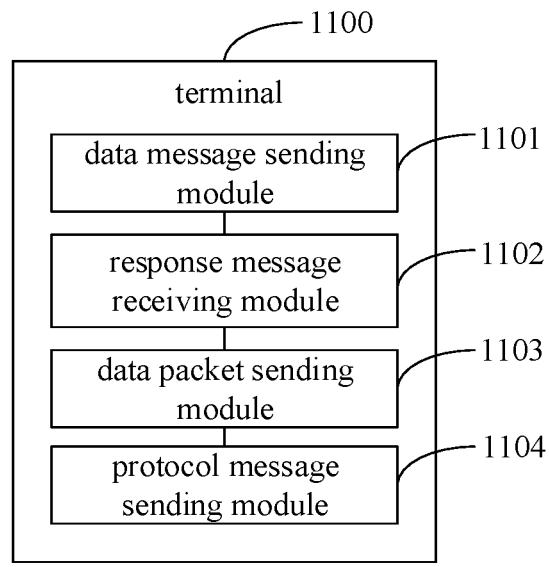
FIG. 12 is a second structural diagram of a terminal according to a fifth embodiment of the present disclosure.

Optionally, referring to FIG. 12, the terminal further includes:

a protocol message sending module 1104, which is to send, when the data transmission indication indicates non-transmitting, an initial radio resource control protocol message at the time-frequency domain position indicated by the uplink scheduling indication.

Optionally, the state transition data includes a data transmission identifier, and the data transmission identifier includes an identifier carried by the random access request message or a random access preamble sequence carried by the random access request message.

Optionally, the random access preamble sequence includes a first type of random access preamble sequence for identifying transmitting and a second type of random access preamble sequence for identifying non-transmitting.

Optionally, an identifier bit indicating whether transmission is required is added to the random access preamble sequence.

Figure 13:
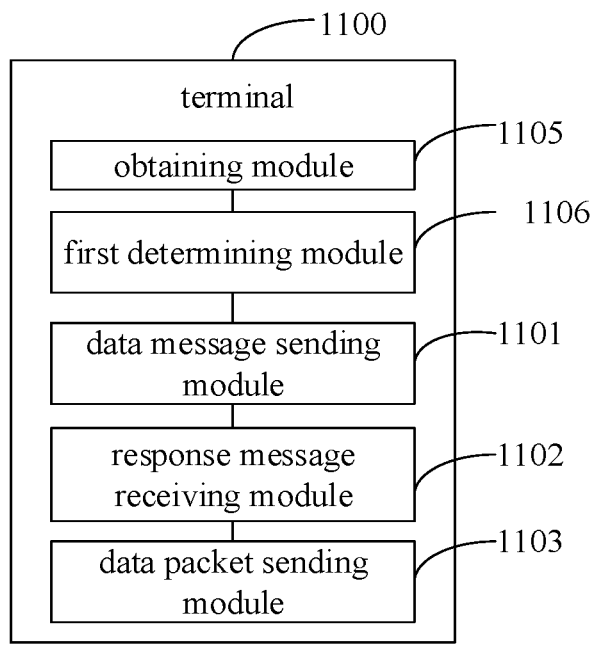
FIG. 13 is a third structural diagram of a terminal according to a fifth embodiment of the present disclosure.

Optionally, referring to FIG. 13, the terminal further includes:

an obtaining module 1105, which is to obtain service feature information of the uplink data packet;

a first determining module 1106, which is to determine, according to the service feature information, whether data transmission is required;

wherein the state transition data carried by the data message is a result of determining whether data transmission is required.

Optionally, the state transition data includes service feature information, the network side device determines whether data transmission is required according to the service feature information, or the network side device determines whether data transmission is required according to the service feature information and network side information acquired by the network side device.

Optionally, the network side information includes at least one of a network side load state, subscription data of a terminal, and operator configuration data.

Optionally, the service feature information includes at least one of a service type, service cache information, a service quality requirement, and a service priority.

Optionally, the service cache information is represented by a cache amount or a cache level;

the service quality requirement is represented by a service quality parameter feature, or by a serial number of numbering the service quality parameter feature, or by a packet loss rate and maximum latency.

Figure 14:
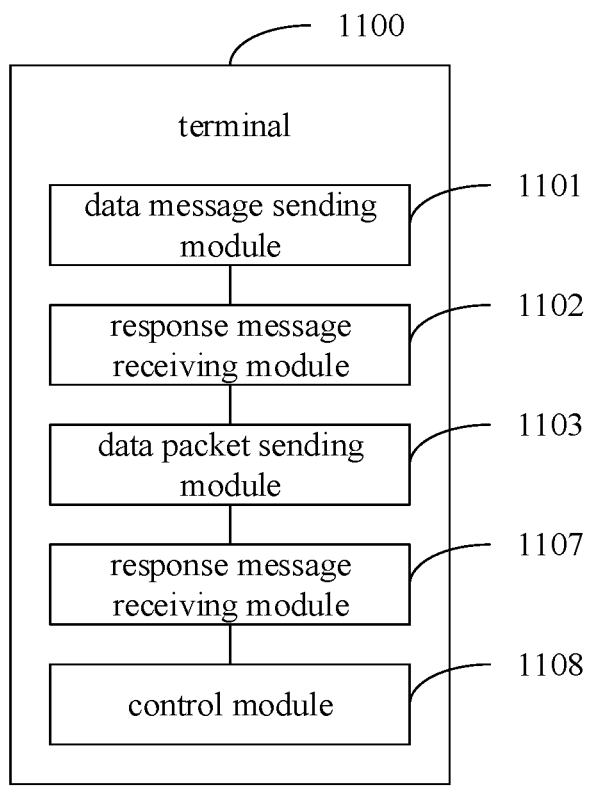
FIG. 14 is a fourth structural diagram of a terminal according to a fifth embodiment of the present disclosure.

Optionally, referring to FIG. 14, a completion identifier for identifying whether transmission of the uplink data packet is completed is carried in the uplink data packet; the terminal further includes:

a response message receiving module 1107, which is to receive a feedback message returned by the network side device according to a receiving status of the uplink data packet and the completion identifier;

a control module 1108, which is to stop, when the feedback message indicates that the reception is successful, transmission of the uplink data packet or establish the air interface signaling connection; when the feedback message indicates that the reception is failed, resend the uplink data packet at a time-frequency domain position indicated by a re-determined uplink scheduling indication carried in the feedback message, or establish the air interface signaling connection according to a connection-permission message carried in the feedback message.

Optionally, when the uplink data packet is successfully received, if the completion identifier is completion, the feedback message carries a rejection message for canceling an initial radio resource control protocol; if the completion identifier is incompletion, the feedback message carries a connection-permission message for establishing the initial radio resource control protocol.

Optionally, the data packet sending module 1103 is to place the uplink data packet in a Media Access Control layer data packet, and send the uplink data packet at the time-frequency domain position indicated by the uplink scheduling indication; or place the uplink data packet in radio resource control protocol layer signaling in the media access control layer data packet, and send the uplink data packet at the time-frequency domain position indicated by the uplink scheduling indication; or take the uplink data packet as the Media Access Control layer data packet, and send the uplink data packet at the time-frequency domain position indicated by the uplink scheduling indication.

Optionally, the data packet sending module 1103 is to place the uplink data packet in an initial radio resource control protocol message and configure a connection reason of the initial radio resource control protocol message as transmission of the uplink data packet.

In this embodiment, before the air interface signaling connection is established, the data message carrying the state transition data is sent to the network side device; the response message returned by the network side device in response to the data message is received, in which the data transmission indication is included in the response message. When the data transmission indication indicates transmitting, the uplink data packet is sent to the network side device. Since it may be controlled whether the uplink data packet is migrated to the RRC connection state for transmission, a latency requirement of service data may be effectively reduced, thus flexibility of network behaviors is improved.

A Sixth Embodiment

Figure 15:
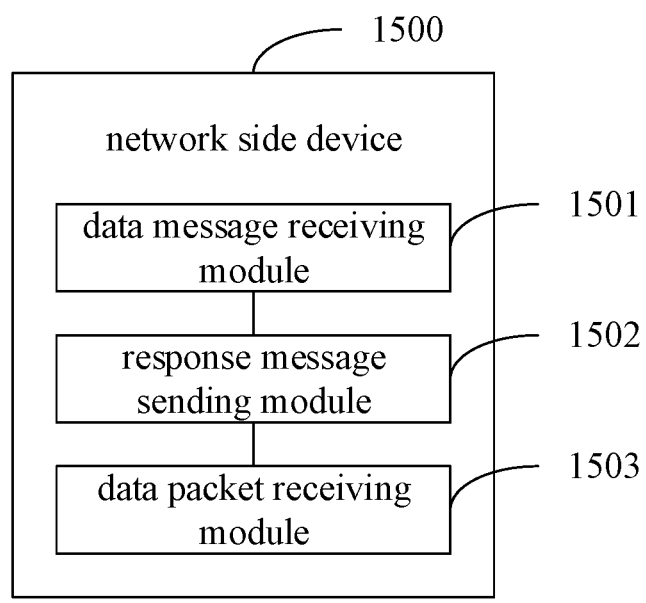
FIG. 15 is a first structural diagram of a network side device according to a sixth embodiment of the present disclosure.

Referring to FIG. 15, which is a structural diagram of a network side device provided by an embodiment of the present disclosure, the network side device may implement the details of the data transmission method in the third embodiment and the fourth embodiment, and achieve the same effects. As shown in FIG. 15, the network side device 1500 includes: a data message receiving module 1501, a response message sending module 1502, and a data packet receiving module 1503.

The data message receiving module 1501 is to receive a data message carrying state transition data sent by a terminal before an air interface signaling connection is established.

The response message sending module 1502 is to return a response message to the terminal based on the data message, wherein a data transmission indication is included in the response message.

The data packet receiving module 1503 is to receive an uplink data packet sent by the terminal when the data transmission indication indicates transmitting.

Optionally, the data packet receiving module 1503 is to, when the data message is a random access request message and the response message is a random access response message, receive the uplink data packet sent by the terminal at a time-frequency domain position indicated by an uplink scheduling indication carried in the random access response message; or receive the uplink data packet sent by the terminal on a default physical channel.

Optionally, a selection identifier for indicating a mode of sending the uplink data packet is included in the random access response message.

Figure 16:
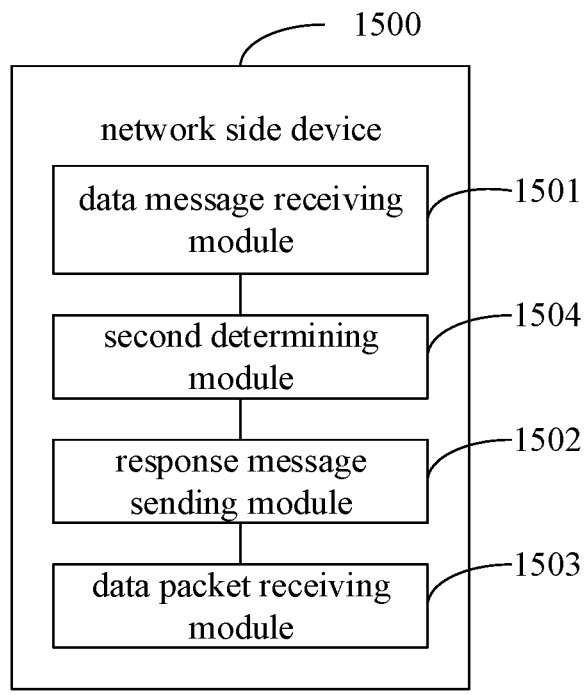
FIG. 16 is a second structural diagram of a network side device according to a sixth embodiment of the present disclosure.

Optionally, referring to FIG. 16, the network side device further includes:

a second determining module 1504, which is to determine whether data transmission is required according to the data transmission identifier carried in the random access request message; or determine whether data transmission is required according to the data transmission identifier carried in the random access request message and acquired network side information.

Optionally, the data transmission identifier includes an identifier carried by the random access request message or a random access preamble sequence carried by the random access request message.

Optionally, when the data transmission identifier includes the random access preamble sequence carried by the random access request message, the random access preamble sequence includes a first type of random access preamble sequence for identifying transmitting and a second type of random access preamble sequence for identifying non-transmitting.

Optionally, when the data transmission identifier includes the random access preamble sequence carried by the random access request message, an identifier bit indicating whether transmission is required is added to the random access preamble sequence.

Figure 17:
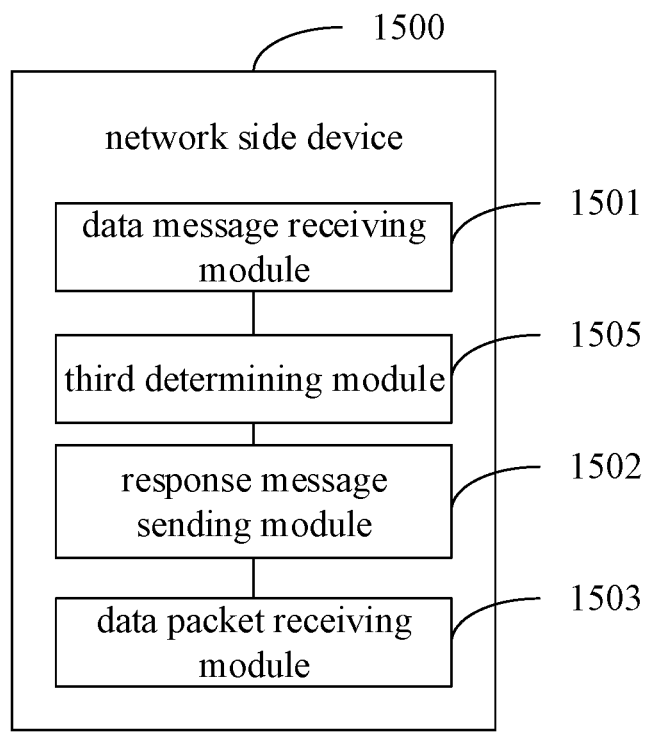
FIG. 17 is a third structural diagram of a network side device according to a sixth embodiment of the present disclosure.

Optionally, referring to FIG. 17, the network side device further includes:

a third determining module 1505, which is to determine whether data transmission is required according to the service feature information carried by the random access request message; or determine whether data transmission is required according to the service feature information carried by the random access request message and acquired network side information.

Optionally, the service feature information includes at least one of a service type, service cache information, a service quality requirement, and a service priority.

Optionally, the service cache information is represented by a cache amount or a cache level;

the service quality requirement is represented by a service quality parameter feature, or by a serial number of numbering the service quality parameter feature, or by a packet loss rate and maximum latency.

Optionally, the network side information includes at least one of a network side load state, subscription data of a terminal, and operator configuration data.

Figure 18:
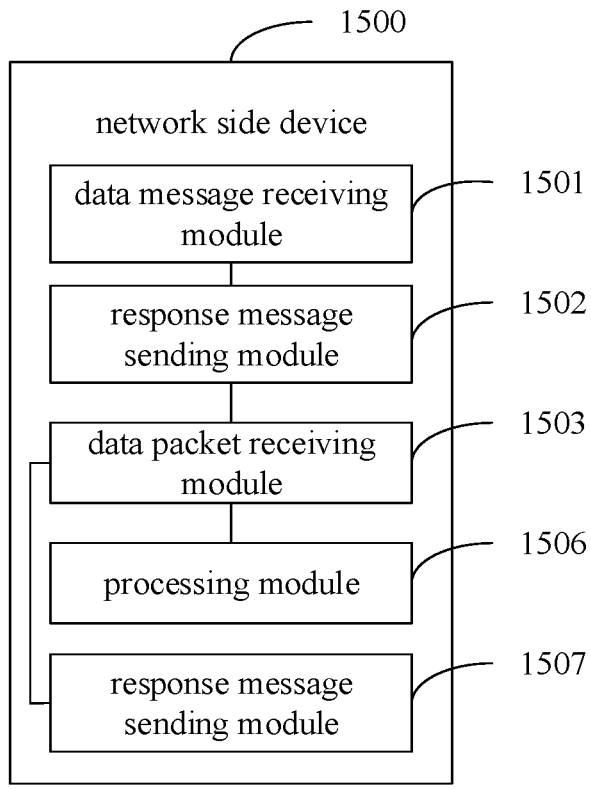
FIG. 18 is a fourth structural diagram of a network side device according to a sixth embodiment of the present disclosure.

Optionally, referring to FIG. 18, the network side device further includes:

a processing module 1056, which is to send, when the uplink data packet is successfully received, a feedback message indicating successful reception to the terminal, and send the received data packet to a core network;

a response message sending module 1507, which is to send, when the reception of the uplink data packet is failed, a feedback message indicating that the reception is failed to the terminal, wherein a re-determined uplink scheduling indication or a connection-permission message used to trigger the terminal to establish a connection is carried in the feedback message.

Optionally, the uplink data packet carries a completion identifier for identifying whether the transmission of the uplink data packet is completed;

when the received uplink data packet is located in the initial radio resource control protocol message and the uplink data packet is successfully received, if the completion identifier is completion, the feedback message carries a rejection message for canceling an initial radio resource control protocol; if the completion identifier is incompletion, the feedback message carries the connection-permission message for establishing the initial radio resource control protocol.

In this embodiment, before the air interface signaling connection is established, the data message carrying the state transition data sent by the terminal is received; the response message is returned to the terminal based on the data message, in which the data transmission indication is included in the response message. The uplink data packet sent by the terminal when the data transmission indication indicates transmitting is received. Since it may be controlled whether the uplink data packet is migrated to the RRC connection state for transmission, a latency requirement of service data may be effectively reduced, thus flexibility of network behaviors is improved.

In this embodiment, before the radio resource control protocol connection is established, the data message carrying the state transition data sent by the terminal is received; the response message is returned to the terminal based on the data message, in which the state transition indication is included in the response message. The uplink data packet sent by the terminal when the state transition indication is non-migration is received. Since it may be controlled whether the uplink data packet is migrated to the RRC connection state for transmission, a latency requirement of service data may be effectively reduced, thus flexibility of network behaviors is improved.

A Seventh Embodiment

Figure 19:
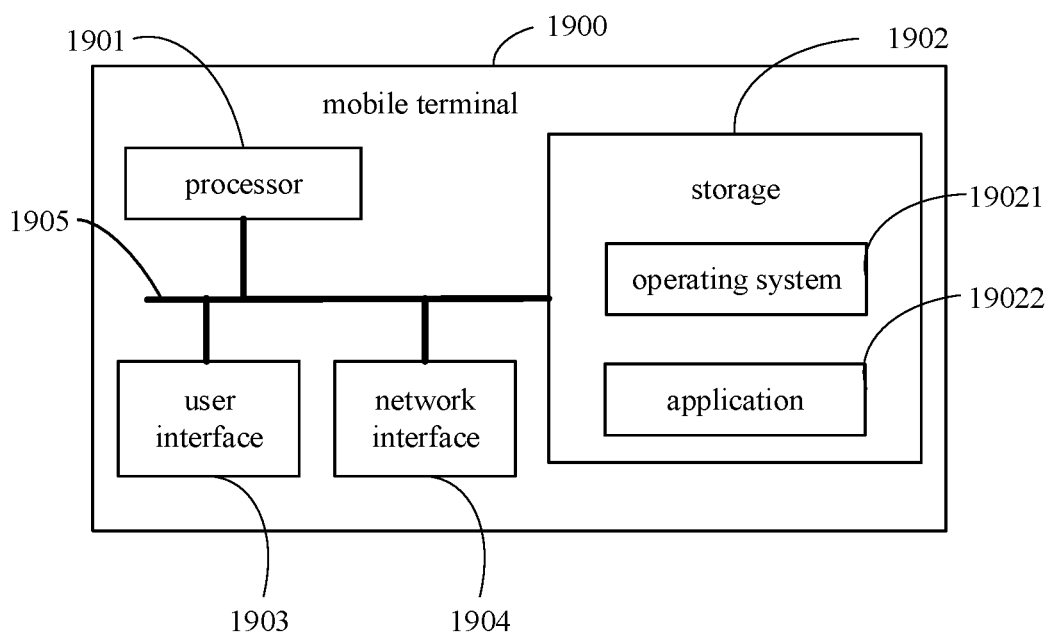
FIG. 19 is a structural diagram of a mobile terminal to which a seventh embodiment of the present disclosure is applied.

Referring to FIG. 19, which is a structural diagram of a mobile terminal to which the embodiment of the present disclosure is applied, which may implement the details of the data transmission method in the first embodiment and the second embodiment, and achieve the same effects. As shown in FIG. 19, the mobile terminal 1900 includes at least one processor 1901, a storage 1902, at least one network interface 1904, and a user interface 1903. The various components in mobile terminal 1900 are coupled together by a bus system 1905. It can be understood that the bus system 1905 is used to implement connection communication between these components. The bus system 1905 includes a power bus, a control bus, and a status signal bus in addition to a data bus. However, for clarity of description, various buses are labeled as bus system 1905 in FIG. 19.

The user interface 1903 may include a display, a keyboard, or a clicking device (e.g., a mouse, a track ball, a touch pad, or a touch screen, etc.).

It can be understood that the storage 1902 in the embodiment of the present disclosure may be a volatile storage or a non-volatile storage, or may include both volatile and non-volatile storage. The non-volatile storage may be a read-only memory (ROM), a programmable ROM (PROM), an Erasable PROM (EPROM), an Electrically EPROM (EEPROM), or a flash memory. The volatile storage may be a Random Access Memory (RAM) that acts as an external cache. By way of example and not limitation, many forms of RAM are available, such as static RAM (SRAM), dynamic RAM (DRAM), synchronous DRAM (SDRAM), Double Data Rate SDRAM (DDRSDRAM), Enhanced SDRAM (ESDRAM), Synchlink DRAM (SLDRAM) and direct rambus RAM (DRRAM). The storage 1902 of the systems and methods described herein is intended to include, without being limited to, these and any other suitable types of memory.

In some embodiments, the storage 1902 stores elements such as executable modules or data structures, or a subset thereof, or an extended set thereof: an operating system 19021 and an application 19022.

The operating system 19021 includes various system programs, such as a framework layer, a core library layer, a driver layer, and the like, for implementing various basic services and processing hardware-based tasks. The application 19022 includes various applications, such as a Media Player, a Browser, etc., for implementing various application services. A program implementing the method of the embodiments of the present disclosure may be included in the application 19022.

In the embodiment of the present disclosure, through calling a program or an instruction stored in the storage 1902, which may be a program or an instruction stored in the application 19022, the processor 1901 is to: send a data message carrying state transition data to a network side device before an air interface signaling connection is established; receive a response message returned by the network side device in response to the data message, wherein a data transmission indication is included in the response message; send an uplink data packet to the network side device when the data transmission indication indicates transmitting.

The method disclosed in the above embodiments of the present disclosure may be applied to the processor 1901 or implemented by the processor 1901. The processor 1901 may be an integrated circuit chip with signal processing capabilities. In the implementation process, each step of the above method may be implemented by an integrated logic circuit of hardware in the processor 1901 or an instruction in a form of software. The processor 1901 may be a general-purpose processor, a digital signal processor (DSP), an application specific integrated circuit (ASIC), a field programmable gate array (FPGA), or like programming logic devices, discrete gates or transistor logic devices, discrete hardware components. The methods, steps, and logical block diagrams disclosed in the embodiments of the present disclosure may be implemented or carried out. The general-purpose processor may be a microprocessor or any conventional processor. The steps of the method disclosed in the embodiments of the present disclosure may be directly implemented by the hardware decoding processor, or may be implemented by a combination of hardware and software modules in the decoding processor. The software modules may be located in a conventional storage medium such as random access memory, flash memory, read only memory, programmable read only memory or electrically erasable programmable memory, registers, and the like. A storage medium is located in the storage 1902. The processor 1901 reads the information in the storage 1902 and implements the steps of the above method in combination with its hardware.

It can be understood that the embodiments described herein may be implemented in hardware, software, firmware, middleware, microcode, or a combination thereof. For hardware implementation, the processing unit may be implemented in one or more Application Specific Integrated Circuits (ASICs), Digital Signal Processing (DSP), Digital Signal Processing Device (DSP Device, DSPD), programmable Logic Device (PLD), Field-Programmable Gate Array (FPGA), general-purpose processor, controller, microcontroller, microprocessor, other electronic unit for performing the functions described herein or a combination thereof.

For a software implementation, the techniques described herein may be implemented by modules (e.g., procedures, functions, and so on) that perform the functions described herein. The software code may be stored in the storage and executed by the processor. The storage may be implemented inside the processor or outside the processor.

Optionally, the processor 1901 is to, when the data message is a random access request message and the response message is a random access response message, send the uplink data packet at a time-frequency domain position indicated by an uplink scheduling indication carried in the random access response message; or send the uplink data packet to the network side device on a default physical channel.

Optionally, a selection identifier for indicating a mode of sending the uplink data packet is included in the random access response message.

Optionally, the processor 1901 is to send, when the data transmission indication indicates non-transmitting, an initial radio resource control protocol message at the time-frequency domain position indicated by the uplink scheduling indication.

Optionally, the state transition data includes a data transmission identifier, and the data transmission identifier includes an identifier carried by the random access request message or a random access preamble sequence carried by the random access request message.

Optionally, the random access preamble sequence includes a first type of random access preamble sequence for identifying transmitting and a second type of random access preamble sequence for identifying non-transmitting.

Optionally, an identifier bit indicating whether transmission is required is added to the random access preamble sequence.

Optionally, the processor 1901 is to obtain service feature information of the uplink data packet; determine, according to the service feature information, whether data transmission is required; wherein the state transition data carried by the data message is a result of determining whether data transmission is required.

Optionally, the state transition data includes service feature information, the network side device determines whether data transmission is required according to the service feature information, or the network side device determines whether data transmission is required according to the service feature information and network side information acquired by the network side device.

Optionally, the network side information includes at least one of a network side load state, subscription data of a terminal, and operator configuration data.

Optionally, the service feature information includes at least one of a service type, service cache information, a service quality requirement, and a service priority.

Optionally, the service cache information is represented by a cache amount or a cache level; the service quality requirement is represented by a service quality parameter feature, or by a serial number of numbering the service quality parameter feature, or by a packet loss rate and maximum latency.

Optionally, a completion identifier for identifying whether transmission of the uplink data packet is completed is carried in the uplink data packet; the processor 1901 is to receive a feedback message returned by the network side device according to a receiving status of the uplink data packet and the completion identifier; stop, when the feedback message indicates that the reception is successful, transmission of the uplink data packet or establish the air interface signaling connection; when the feedback message indicates that the reception is failed, resend the uplink data packet at a time-frequency domain position indicated by a re-determined uplink scheduling indication carried in the feedback message, or establish the air interface signaling connection according to a connection-permission message carried in the feedback message.

Optionally, when the uplink data packet is successfully received, if the completion identifier is completion, the feedback message carries a rejection message for canceling an initial radio resource control protocol; if the completion identifier is incompletion, the feedback message carries a connection-permission message for establishing the initial radio resource control protocol.

Optionally, the processor 1901 is to place the uplink data packet in a Media Access Control layer data packet, and send the uplink data packet at the time-frequency domain position indicated by the uplink scheduling indication; or place the uplink data packet in radio resource control protocol layer signaling in the media access control layer data packet, and send the uplink data packet at the time-frequency domain position indicated by the uplink scheduling indication; or take the uplink data packet as the Media Access Control layer data packet, and send the uplink data packet at the time-frequency domain position indicated by the uplink scheduling indication.

Optionally, the placing the uplink data packet in radio resource control protocol layer signaling in the media access control layer data packet includes placing the uplink data packet in an initial radio resource control protocol message and configuring a connection reason of the initial radio resource control protocol message as transmission of the uplink data packet.

In this embodiment, before the air interface signaling connection is established, the data message carrying the state transition data is sent to the network side device; the response message returned by the network side device in response to the data message is received, in which the data transmission indication is included in the response message. When the data transmission indication indicates transmitting, the uplink data packet is sent to the network side device. Since it may be controlled whether the uplink data packet is migrated to the RRC connection state for transmission, a latency requirement of service data may be effectively reduced, thus flexibility of network behaviors is improved.

An Eighth Embodiment

Figure 20:
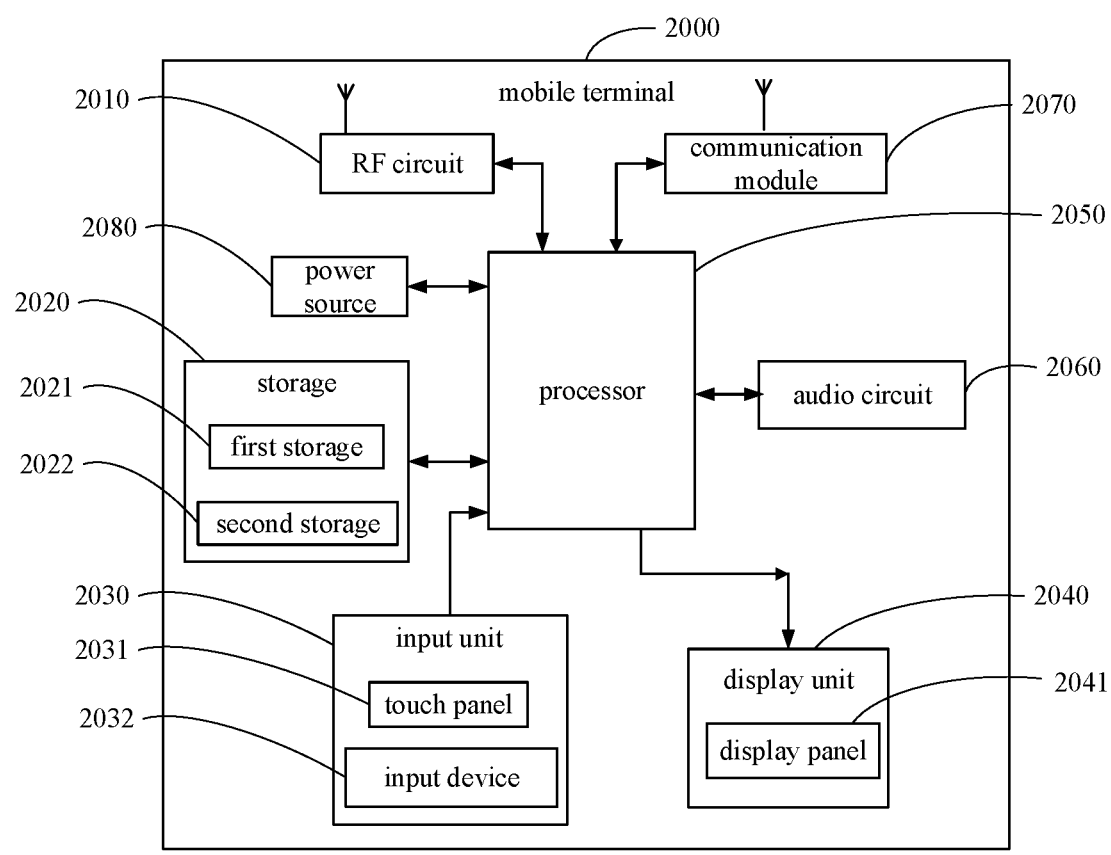
FIG. 20 is a structural diagram of a mobile terminal to which an eighth embodiment of the present disclosure is applied.

Referring to FIG. 20, which is a structural diagram of a mobile terminal according to an embodiment of the present disclosure, the mobile terminal may implement details of the data transmission method in the first embodiment and the second embodiment, and achieve the same effects. As shown in FIG. 20, the mobile terminal 2000 includes a radio frequency (RF) circuit 2010, a storage 2020, an input unit 2030, a display unit 2040, a processor 2050, an audio circuit 2060, a communication module 2070, and a power source 2080.

The input unit 2030 may receive numeric or character information input by a user, and generate signal input related to user settings and function control of the mobile terminal 2000. Specifically, in the embodiment of the present disclosure, the input unit 2030 may include a touch panel 2031. The touch panel 2031, also referred to as a touch screen, may collect touch operations of the user on or near the touch panel 2031 (such as an operation of the user on the touch panel 2031 using any suitable object or accessory such as a finger or a stylus), and drive a corresponding connection device according to a preset program. Optionally, the touch panel 2031 may include two parts: a touch detection device and a touch controller. In this case, the touch detection device detects a touch orientation of the user, detects a signal brought by the touch operation, and transmits the signal to the touch controller. The touch controller receives the touch information from the touch detection device, converts the touch information into contact coordinates, sends the contact coordinates to the processor 2050, receives commands from the processor 2050 and executes the commands. In addition, the touch panel 2031 may be implemented in various types such as resistive, capacitive, infrared, and surface acoustic waves. In addition to the touch panel 2031, the input unit 2030 may further include another input device 2032. The other input device 2032 may include, but is not limited to, one of more of a physical keyboard, a function key (such as a volume control button, a switch button, etc.), a trackball, a mouse, a joystick, etc.

The display unit 2040 may display information input by the user or information provided to the user and various menu interfaces of the mobile terminal 2000. The display unit 2040 may include a display panel 2041. Alternatively, the display panel 2041 may be configured in the form of an LCD or an Organic Light-Emitting Diode (OLED).

It should be noted that the touch panel 2031 may cover the display panel 2041 to form a touch display screen. When the touch display screen detects a touch operation on or near it, the touch display screen transmits the touch operation to the processor 2050 to determine the type of the touch event, and then the processor 2050 provides a corresponding visual output on the touch display screen depending on the type of touch event.

The touch display screen includes an application interface display area and a common control display area. The arrangement mode of the application interface display area and the common control display area is not limited, and the two display areas may be distinguished by up-and-down arrangement, left-and-right arrangement, and the like. The application interface display area may display an interface of an application. Each interface may include an interface element such as at least one application icon and/or widget desktop control. The application interface display area may also be an empty interface that does not contain any contents. The common control display area may display a control with high usage, such as a setting button, an interface number, a scroll bar, an application icon such as a phone book icon, and the like.

The processor 2050 is a control center of the mobile terminal 2000, and connects various parts of the entire mobile phone using various interfaces and lines. Through running or executing software programs and/or modules stored in a first storage 2021, and calling the data stored in a second storage 2022, the processor 2050 implements various functions and processing data of the mobile terminal 2000, thus performs overall monitoring on the mobile terminal 2000. Optionally, the processor 2050 may include one or more processing units.

In an embodiment of the present disclosure, through running or executing software programs and/or modules stored in the first storage 2021, and calling the data stored in the second storage 2022, the processor 2050 is to send a data message carrying state transition data to a network side device before an air interface signaling connection is established; receive a response message returned by the network side device in response to the data message, wherein a data transmission indication is included in the response message; send an uplink data packet to the network side device when the data transmission indication indicates transmitting.

Optionally, the processor 2050 is to, when the data message is a random access request message and the response message is a random access response message, send the uplink data packet at a time-frequency domain position indicated by an uplink scheduling indication carried in the random access response message; or send the uplink data packet to the network side device on a default physical channel.

Optionally, a selection identifier for indicating a mode of sending the uplink data packet is included in the random access response message.

Optionally, the processor 2050 is to send, when the data transmission indication indicates non-transmitting, an initial radio resource control protocol message at the time-frequency domain position indicated by the uplink scheduling indication.

Optionally, the state transition data includes a data transmission identifier, and the data transmission identifier includes an identifier carried by the random access request message or a random access preamble sequence carried by the random access request message.

Optionally, the random access preamble sequence includes a first type of random access preamble sequence for identifying transmitting and a second type of random access preamble sequence for identifying non-transmitting.

Optionally, an identifier bit indicating whether transmission is required is added to the random access preamble sequence.

Optionally, the processor 2050 is to obtain service feature information of the uplink data packet; determine, according to the service feature information, whether data transmission is required; wherein the state transition data carried by the data message is a result of determining whether data transmission is required.

Optionally, the state transition data includes service feature information, the network side device determines whether data transmission is required according to the service feature information, or the network side device determines whether data transmission is required according to the service feature information and network side information acquired by the network side device.

Optionally, the network side information includes at least one of a network side load state, subscription data of a terminal, and operator configuration data.

Optionally, the service feature information includes at least one of a service type, service cache information, a service quality requirement, and a service priority.

Optionally, the service cache information is represented by a cache amount or a cache level; the service quality requirement is represented by a service quality parameter feature, or by a serial number of numbering the service quality parameter feature, or by a packet loss rate and maximum latency.

Optionally, a completion identifier for identifying whether transmission of the uplink data packet is completed is carried in the uplink data packet; the processor 2050 is to receive a feedback message returned by the network side device according to a receiving status of the uplink data packet and the completion identifier; stop, when the feedback message indicates that the reception is successful, transmission of the uplink data packet or establish the air interface signaling connection; when the feedback message indicates that the reception is failed, resend the uplink data packet at a time-frequency domain position indicated by a re-determined uplink scheduling indication carried in the feedback message, or establish the air interface signaling connection according to a connection-permission message carried in the feedback message.

Optionally, when the uplink data packet is successfully received, if the completion identifier is completion, the feedback message carries a rejection message for canceling an initial radio resource control protocol; if the completion identifier is incompletion, the feedback message carries a connection-permission message for establishing the initial radio resource control protocol.

Optionally, the processor 2050 is to place the uplink data packet in a Media Access Control layer data packet, and send the uplink data packet at the time-frequency domain position indicated by the uplink scheduling indication; or place the uplink data packet in radio resource control protocol layer signaling in the media access control layer data packet, and send the uplink data packet at the time-frequency domain position indicated by the uplink scheduling indication; or take the uplink data packet as the Media Access Control layer data packet, and send the uplink data packet at the time-frequency domain position indicated by the uplink scheduling indication.

Optionally, the placing the uplink data packet in radio resource control protocol layer signaling in the media access control layer data packet includes placing the uplink data packet in an initial radio resource control protocol message and configuring a connection reason of the initial radio resource control protocol message as transmission of the uplink data packet.

In this embodiment, before the air interface signaling connection is established, the data message carrying the state transition data is sent to the network side device; the response message returned by the network side device in response to the data message is received, in which the data transmission indication is included in the response message. When the data transmission indication indicates transmitting, the uplink data packet is sent to the network side device. Since it may be controlled whether the uplink data packet is migrated to the RRC connection state for transmission, a latency requirement of service data may be effectively reduced, thus flexibility of network behaviors is improved.

The person skilled in the art may appreciate that the elements and algorithm steps of the various embodiments disclosed herein may be implemented in electronic hardware or a combination of computer software and electronic hardware. Whether these functions are implemented in hardware or software depends on a particular application and design constraints of the solution. The person skilled in the art may use different methods to implement the described functions for each particular application, but such implementation should not be considered to be beyond the scope of the present disclosure.

The person skilled in the art may clearly understand that for convenience and brevity of the description, the specific working process of the system, the device and the unit described above may refer to the corresponding process in the foregoing method embodiment, and details are not described herein again.

In the embodiments provided by the present disclosure, it should be understood that the disclosed apparatus and method may be implemented in other modes. For example, the device embodiments described above are illustrative. For example, the division of the units is a logical function division. In actual implementation, there may be another division mode, For example, multiple units or components may be combined or be integrated into another system, or some features may be ignored or not executed. In addition, the coupling or direct coupling or communication connection shown or discussed herein may be an indirect coupling or communication connection through an interface, a device or a unit, and may be electrical, mechanical or the like.

The units described as separate components may or may not be physically separated, and the components displayed as units may or may not be physical units, that is, may be located in one place, or may be distributed to multiple network units. Some or all of the units may be selected according to actual needs to achieve the objectives of the embodiments of the present disclosure.

In addition, each functional unit in various embodiments of the present disclosure may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the essential parts of the technical solution mentioned above or the part contributed to the prior art can be presented in the form of a software product. The software product may be stored in a storage medium, and includes a plurality of instructions for making a computer device (which can be a personal computer, a server or a network device) implement all or part of steps in the methods of the present disclosure. The storage medium includes various media that can store program codes, such as a USB flash drive, a mobile hard disk, a ROM, a RAM, a magnetic disk, or an optical disk.

In addition, an embodiment of the present disclosure further provides a network side device, including a storage, a processor, and a computer program stored in the storage and executed by the processor, the processor executes the computer program to implement steps of the data transmission method in FIGS. 7 to 10.

The above are several embodiments of the present disclosure, and are not used for limiting the protection scope of the present disclosure. Any modifications, equivalents, improvements, etc., made under the principle of the present disclosure should be included in the protection scope of the present disclosure. As such, the protection scope of the present disclosure should be determined by the scope of the claims.

It should be noted that the foregoing uplink scheduling indication may be one or more than one, which is not limited herein.

What is claimed is:

1. A mobile terminal, comprising: a storage, a processor, and a computer program stored in the storage and executed by the processor, the processor executing the computer program to,
send a data message carrying state transition data to a network side device before an air interface signaling connection is established;
receive a response message returned by the network side device in response to the data message, wherein a data transmission indication is comprised in the response message; wherein the data transmission indication is configured to indicate transmitting or non-transmitting;
send an uplink data packet to the network side device when the data transmission indication indicates transmitting;
wherein the state transition data is configured to indicate whether uplink data to be transmitted supports a data transmission mode without state transition;
wherein when the data message is a random access request message and the response message is a random access response message, the processor executes the computer program to,
send the uplink data packet at a time-frequency domain position indicated by an uplink scheduling indication carried in the random access response message; or
send the uplink data packet to the network side device on a default physical channel.

2. The terminal of claim 1, wherein after receiving the response message returned by the network side device in response to the data message, wherein the data transmission indication is comprised in the response message, for sending the uplink data packet to the network side device, the processor executes the computer program to,
when the data transmission indication indicates non-transmitting, send an initial radio resource control (RRC) protocol message at the time-frequency domain position indicated by the uplink scheduling indication.

3. The terminal of claim 1, wherein a selection identifier for indicating a mode of sending the uplink data packet is comprised in the random access response (RAR) message; and/or,
the state transition data comprises a data transmission identifier, and the data transmission identifier comprises an identifier carried by the random access request message or a random access preamble sequence carried by the random access request message;
when the data transmission identifier comprises the random access preamble sequence carried by the random access request message, the random access preamble sequence comprises a first type of random access preamble sequence for identifying transmitting and a second type of random access preamble sequence for identifying non-transmitting, or, an identifier bit indicating whether transmission is required is added to the random access preamble sequence.

4. The terminal of claim 1, wherein before sending the data message carrying state transition data to the network side device, the processor executes the computer program to,
obtain service feature information of the uplink data packet;
determine, according to the service feature information, whether data transmission is required;
wherein the state transition data carried by the data message is a result of determining whether data transmission is required.

5. The terminal of claim 1, wherein the state transition data comprises service feature information, the network side device determines whether data transmission is required according to the service feature information, or the network side device determines whether data transmission is required according to the service feature information and network side information acquired by the network side device.

6. The terminal of claim 1, wherein a completion identifier for identifying whether transmission of the uplink data packet is completed is carried in the uplink data packet;
wherein when the data transmission indication indicates transmitting, after the sending the uplink data packet to the network side device before the air interface signaling connection is established, the processor executes the computer program to,
receive a feedback message returned by the network side device according to a receiving status of the uplink data packet and the completion identifier;
when the feedback message indicates that the reception is successful, stop transmission of the uplink data packet or establish the air interface signaling connection;
when the feedback message indicates that the reception is failed, resend the uplink data packet at a time-frequency domain position indicated by a re-determined uplink scheduling indication carried in the feedback message, or establish the air interface signaling connection according to a connection-permission message carried in the feedback message.

7. The terminal of claim 6, wherein the feedback message returned by the network side device according to the receiving status of the uplink data packet and the completion identifier comprises:
when the uplink data packet is successfully received, if the completion identifier is completion, the feedback message carries a rejection message for canceling an initial radio resource control protocol; if the completion identifier is incompletion, the feedback message carries a connection-permission message for establishing the initial radio resource control protocol.

8. The terminal of claim 6, wherein for sending the uplink data packet at the time-frequency domain position indicated by the uplink scheduling indication carried in the random access response message, the processor executes the computer program to,
place the uplink data packet in a media access control (MAC) layer data packet, and send the uplink data packet at the time-frequency domain position indicated by the uplink scheduling indication; or
place the uplink data packet in radio resource control protocol layer signaling in the media access control layer data packet, and send the uplink data packet at the time-frequency domain position indicated by the uplink scheduling indication; or
take the uplink data packet as the media access control layer data packet, and send the uplink data packet at the time-frequency domain position indicated by the uplink scheduling indication.

9. The terminal of claim 8, wherein for placing the uplink data packet in radio resource control protocol layer signaling in the media access control layer data packet, the processor executes the computer program to,
place the uplink data packet in an initial radio resource control protocol message and configure a connection reason of the initial radio resource control protocol message as transmission of the uplink data packet.

10. A network side device, comprising: a storage, a processor, and a computer program stored in the storage and executed by the processor, the processor executing the computer program to,
receive a data message carrying state transition data sent by a terminal before an air interface signaling connection is established;
return a response message to the terminal based on the data message, wherein a data transmission indication is comprised in the response message; wherein the data transmission indication is configured to indicate transmitting or non-transmitting;
receive an uplink data packet sent by the terminal when the data transmission indication indicates transmitting;
wherein the state transition data is configured to indicate whether uplink data to be transmitted supports a data transmission mode without state transition;
wherein when the data message is a random access request message and the response message is a random access response message, for receiving the uplink data packet sent by the terminal when the data transmission indication indicates transmitting, the processor executes the computer program to,
receive the uplink data packet sent by the terminal at a time-frequency domain position indicated by an uplink scheduling indication carried in the random access response message; or
receive the uplink data packet sent by the terminal on a default physical channel.

11. The network side device of claim 10, wherein a data transmission identifier is comprised in the state transition data, before returning the response message to the terminal based on the data message, the processor executes the computer program to,
determine whether data transmission is required according to the data transmission identifier carried in the random access request message; or
determine whether data transmission is required according to the data transmission identifier carried in the random access request message and acquired network side information.

12. The network side device of claim 11, wherein a selection identifier for indicating a mode of sending the uplink data packet is comprised in the random access response message; and/or,
the data transmission identifier comprises an identifier carried by the random access request message or a random access preamble sequence carried by the random access request message;
when the data transmission identifier comprises the random access preamble sequence carried by the random access request message, the random access preamble sequence comprises a first type of random access preamble sequence for identifying transmitting and a second type of random access preamble sequence for identifying non-transmitting, or, an identifier bit indicating whether transmission is required is added to the random access preamble sequence.

13. The network side device of claim 10, wherein the state transition data comprises service feature information, before returning the response message to the terminal based on the data message, the processor executes the computer program to,
determine whether data transmission is required according to the service feature information carried by the random access request message; or
determine whether data transmission is required according to the service feature information carried by the random access request message and acquired network side information.

14. The network side device of claim 13, wherein the service feature information comprises at least one of a service type, service cache information, a service quality requirement, or a service priority;
the service cache information is represented by a cache amount or a cache level;
the service quality requirement is represented by a service quality parameter feature, or by a serial number of numbering the service quality parameter feature, or by a packet loss rate and maximum latency;
the network side information comprises at least one of a network side load state, subscription data of a terminal, or operator configuration data.

15. The network side device of claim 10, wherein after receiving the uplink data packet sent by the terminal when the data transmission indication indicates transmitting, the processor executes the computer program to,
when the uplink data packet is successfully received, send a feedback message indicating successful reception to the terminal, and send the received data packet to a core network;
when the reception of the uplink data packet is failed, send a feedback message indicating that the reception is failed to the terminal, wherein a re-determined uplink scheduling indication or a connection-permission message used to trigger the terminal to establish a connection is carried in the feedback message.

16. The network side device of claim 15, wherein the uplink data packet carries a completion identifier for identifying whether the transmission of the uplink data packet is completed;

when the received uplink data packet is located in the initial radio resource control protocol message and the uplink data packet is successfully received, if the completion identifier is completion, the feedback message carries a rejection message for canceling an initial radio resource control protocol; if the completion identifier is incompletion, the feedback message carries the connection-permission message for establishing the initial radio resource control protocol.

\* \* \* \* \*